(12) United States Patent
Pongo et al.

(10) Patent No.: US 11,433,863 B2
(45) Date of Patent: Sep. 6, 2022

(54) ANTI-LOCK BRAKE SYSTEM FOR ALL-TERRAIN VEHICLE

(71) Applicant: Polaris Industries Inc., Medina, MN (US)

(72) Inventors: Harry Pongo, Gatzke, MN (US); Brent J. Hanson, Warroad, MN (US); Jeremy R. Eichenberger, Warroad, MN (US); Jason K. Raska, New Richmond, WI (US); Michael D. Schneider, Princeton, MN (US); Ryan K. Lovold, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 1 day.

(21) Appl. No.: 16/939,259

(22) Filed: Jul. 27, 2020

(65) Prior Publication Data
US 2021/0009097 A1  Jan. 14, 2021

Related U.S. Application Data

(63) Continuation of application No. 15/471,469, filed on Mar. 28, 2017, now Pat. No. 10,723,334.

(51) Int. Cl.
*B60T 8/34*  (2006.01)
*B60T 11/20*  (2006.01)
(Continued)

(52) U.S. Cl.
CPC ............... *B60T 8/34* (2013.01); *B60K 5/00* (2013.01); *B60K 17/165* (2013.01); *B60K 17/34* (2013.01);
(Continued)

(58) Field of Classification Search
CPC ... B60T 8/34; B60T 11/20; B60T 7/04; B60T 7/08; B60K 2005/003; B60K 17/34; B60K 17/165; B60K 5/00; B60Y 2200/124
See application file for complete search history.

(56) References Cited

U.S. PATENT DOCUMENTS

| | | |
|---|---|---|
| 1,567,982 A | 12/1925 | Pfeiffer |
| 1,606,224 A | 11/1926 | Hoeller |
| (Continued) | | |

FOREIGN PATENT DOCUMENTS

| | | |
|---|---|---|
| CN | 1935589 A | 3/2007 |
| CN | 101643006 A | 2/2010 |
| (Continued) | | |

OTHER PUBLICATIONS

International Search Report and Written Opinion issued by the European Patent Office, dated Jul. 24, 2018, for International Patent Application No. PCT/US2018/024775; 10 pages.
(Continued)

*Primary Examiner* — Vishal R Sahni
(74) *Attorney, Agent, or Firm* — Faegre Drinker Biddle & Reath LLP

(57) ABSTRACT

An all-terrain vehicle is disclosed having a braking system with an anti-lock braking control module and a first brake master cylinder hydraulically coupled to the anti-lock braking control module. A first brake actuator is coupled to the first brake master cylinder and a brake caliper is coupled to at least some of the ground engaging members. The first brake master cylinder upon actuation provides anti-lock braking to either the first or second ground engaging members. A second brake master cylinder is hydraulically coupled to the anti-lock braking control module. A second brake actuator is coupled to the second brake master cylinder and a brake caliper is coupled to at least some of the
(Continued)

ground engaging members. The second brake master cylinder upon actuation provides anti-lock braking to either the first or second ground engaging members. The vehicle also has a speed monitor with a gear ring positioned on an exterior surface of a stub shaft and a speed pickup positioned adjacent to the gear ring.

19 Claims, 19 Drawing Sheets

(51) Int. Cl.
| | |
|---|---|
| B60T 7/04 | (2006.01) |
| B60T 7/08 | (2006.01) |
| B60K 17/16 | (2006.01) |
| B60K 17/34 | (2006.01) |
| B60K 5/00 | (2006.01) |
| B60K 17/348 | (2006.01) |
| B60T 8/32 | (2006.01) |
| B60K 17/354 | (2006.01) |
| B60T 8/36 | (2006.01) |

(52) U.S. Cl.
CPC .......... *B60K 17/348* (2013.01); *B60K 17/354* (2013.01); *B60T 7/04* (2013.01); *B60T 7/08* (2013.01); *B60T 8/322* (2013.01); *B60T 8/3685* (2013.01); *B60T 11/20* (2013.01); B60K 2005/003 (2013.01); B60T 8/3225 (2013.01); B60Y 2200/124 (2013.01)

(56) References Cited

U.S. PATENT DOCUMENTS

| | | |
|---|---|---|
| 2,313,991 A | 3/1943 | Fitch |
| 3,159,974 A | 12/1964 | Rodgers |
| 3,473,634 A | 10/1969 | Strifler et al. |
| 3,486,591 A | 12/1969 | Scheffler |
| 3,554,334 A | 1/1971 | Shimano et al. |
| 3,750,857 A | 8/1973 | Marschall et al. |
| 3,868,001 A | 2/1975 | Yokoi |
| 3,885,392 A | 5/1975 | Haraikawa |
| 3,960,030 A | 6/1976 | Williams |
| 3,999,807 A | 12/1976 | Haraikawa |
| 4,024,932 A | 5/1977 | Fay |
| 4,161,239 A | 7/1979 | Karasudani |
| 4,174,867 A | 11/1979 | Oberthur |
| 4,176,886 A | 12/1979 | Watanabe |
| 4,189,190 A | 2/1980 | Luepertz |
| 4,239,294 A | 12/1980 | Burgdorf |
| 4,274,518 A | 6/1981 | Berisch |
| 4,289,359 A | 9/1981 | Luepertz et al. |
| 4,421,359 A | 12/1983 | Hayashi et al. |
| 4,456,310 A | 6/1984 | Hayashi et al. |
| 4,465,322 A | 8/1984 | Hayashi |
| 4,494,800 A | 1/1985 | Hayashi |
| 4,598,954 A | 7/1986 | Hayashi |
| 4,697,825 A | 10/1987 | Hayashi et al. |
| 4,702,339 A | 10/1987 | Hayashi et al. |
| 4,733,757 A | 3/1988 | Hayashi et al. |
| 4,766,982 A | 8/1988 | Hayashi et al. |
| 4,770,473 A | 9/1988 | Tsuchida |
| 4,852,701 A | 8/1989 | Wakatsuki |
| 4,865,399 A | 9/1989 | Atkins et al. |
| 4,943,922 A | 7/1990 | Tanaka |
| 4,976,501 A | 12/1990 | Sivulka et al. |
| 5,036,960 A | 8/1991 | Schenk et al. |
| 5,134,352 A | 7/1992 | Matsumoto et al. |
| 5,195,717 A | 3/1993 | Benz et al. |
| 5,219,211 A | 6/1993 | Tsuchida et al. |
| 5,246,276 A | 9/1993 | Pajonk et al. |
| 5,273,346 A | 12/1993 | Tsuchida et al. |
| 5,344,220 A | 9/1994 | Roll et al. |
| 5,363,943 A | 11/1994 | Iwashita et al. |
| 5,372,408 A | 12/1994 | Tsuchida et al. |
| 5,445,443 A | 8/1995 | Hauser et al. |
| 5,501,511 A | 3/1996 | Wagner |
| 5,544,946 A | 8/1996 | Toyoda et al. |
| 5,564,534 A | 10/1996 | Toyoda et al. |
| 5,586,814 A | 12/1996 | Steiner |
| 5,615,934 A | 4/1997 | Abuelsamid |
| 5,620,237 A | 4/1997 | Iwashita et al. |
| 5,628,387 A | 5/1997 | Schantzen |
| 5,683,152 A | 11/1997 | Hu |
| 5,727,852 A | 3/1998 | Pueschel et al. |
| 5,730,256 A | 3/1998 | Namngani |
| 5,918,948 A | 7/1999 | Burgdorf et al. |
| 5,971,499 A | 10/1999 | Pape et al. |
| 6,092,877 A | 7/2000 | Rasidescu et al. |
| 6,095,276 A * | 8/2000 | Kuroda ................. F16H 48/295 180/247 |
| 6,142,583 A | 11/2000 | Steffes |
| 6,155,655 A | 12/2000 | Matsuno |
| 6,273,523 B1 | 8/2001 | Wakabayashi et al. |
| 6,390,566 B1 | 5/2002 | Matsuno |
| 6,407,663 B1 | 6/2002 | Huggett |
| 6,419,329 B1 | 7/2002 | Buschmann et al. |
| 6,478,103 B1 | 11/2002 | Matsuura |
| 6,652,039 B1 | 11/2003 | Shull et al. |
| 6,772,864 B1 | 8/2004 | Luh |
| 6,793,295 B2 | 9/2004 | Sakamoto |
| 6,802,400 B2 | 10/2004 | Ohura |
| 6,814,413 B2 | 11/2004 | Davison |
| 6,817,434 B1 | 11/2004 | Sweet |
| 6,835,904 B2 | 12/2004 | McGuire et al. |
| 6,883,630 B2 | 4/2005 | Morin |
| 6,923,514 B1 | 8/2005 | Spieker et al. |
| 7,219,965 B2 | 5/2007 | Wagner |
| 7,331,640 B2 | 2/2008 | Koyama |
| 7,350,881 B2 | 4/2008 | Asahi |
| 7,611,212 B2 | 11/2009 | Nakayama et al. |
| 7,695,074 B2 | 4/2010 | Pongo |
| 7,918,301 B2 | 4/2011 | Ito et al. |
| 8,002,066 B2 | 8/2011 | Harada |
| 8,140,236 B2 | 3/2012 | Eckert et al. |
| 8,186,470 B2 | 5/2012 | Matayoshi |
| 8,439,455 B2 | 5/2013 | Hayashi et al. |
| 8,616,324 B2 | 12/2013 | Chipp |
| 8,633,611 B2 | 1/2014 | Waida et al. |
| 8,651,213 B2 | 2/2014 | Nagakubo et al. |
| 8,887,859 B2 | 11/2014 | Matsushima |
| 8,933,797 B2 | 1/2015 | Deigmoller et al. |
| 8,973,696 B2 | 3/2015 | Hamauzu et al. |
| 9,010,475 B2 | 4/2015 | Nagai et al. |
| 9,022,157 B2 | 5/2015 | Konno et al. |
| 9,033,429 B2 | 5/2015 | Waida et al. |
| 9,085,287 B2 | 7/2015 | Moore et al. |
| 9,120,520 B2 | 9/2015 | Miyamoto et al. |
| 9,132,813 B2 | 9/2015 | Matsuda |
| 9,156,453 B2 | 10/2015 | Takatsuka et al. |
| 9,260,058 B2 | 2/2016 | Takasaki et al. |
| 9,527,362 B2 | 12/2016 | Brady et al. |
| 9,771,084 B2 | 9/2017 | Norstad |
| 10,246,153 B2 | 4/2019 | Deckard et al. |
| 10,369,886 B2 | 8/2019 | Safranski et al. |
| 10,723,334 B2 | 7/2020 | Pongo et al. |
| 2001/0030464 A1 | 10/2001 | Kouauki |
| 2002/0063010 A1 | 5/2002 | Morin |
| 2002/0088661 A1 | 7/2002 | Gagnon |
| 2003/0004632 A1 | 1/2003 | Walenty et al. |
| 2004/0035629 A1 | 2/2004 | Morin et al. |
| 2004/0239180 A1 | 12/2004 | Foust |
| 2005/0134114 A1 | 6/2005 | Asahi |
| 2005/0146207 A1 | 7/2005 | Wagner |
| 2005/0206231 A1 | 9/2005 | Lu et al. |
| 2005/0228568 A1 | 10/2005 | Hack |
| 2006/0152071 A1 | 7/2006 | Takeuchi |
| 2006/0175895 A1 | 8/2006 | Mahlo et al. |
| 2007/0075582 A1 | 4/2007 | Nakayama et al. |
| 2007/0139255 A1 | 6/2007 | Kamping et al. |
| 2007/0145227 A1 | 6/2007 | Hasegawa |
| 2007/0200430 A1 | 8/2007 | Tani |
| 2007/0267916 A1 | 11/2007 | MacKovjak et al. |

(56) References Cited

U.S. PATENT DOCUMENTS

| | | |
|---|---|---|
| 2009/0033144 A1* | 2/2009 | Ikeda .................. B62L 3/08 303/20 |
| 2009/0118961 A1 | 5/2009 | Eckert et al. |
| 2009/0243378 A1 | 10/2009 | Ito et al. |
| 2010/0000818 A1 | 1/2010 | Fukuyama et al. |
| 2010/0304930 A1 | 12/2010 | Poulin |
| 2011/0232987 A1 | 9/2011 | Chipp |
| 2011/0297462 A1 | 12/2011 | Grajkowski |
| 2011/0315459 A1 | 12/2011 | Zuchoski |
| 2012/0150409 A1 | 6/2012 | Ogawa et al. |
| 2012/0186895 A1 | 7/2012 | Hamauzu et al. |
| 2012/0200148 A1 | 8/2012 | Waida et al. |
| 2012/0211295 A1 | 8/2012 | Nagai et al. |
| 2012/0247858 A1 | 10/2012 | Konno et al. |
| 2012/0303234 A1 | 11/2012 | Matsuda |
| 2013/0009378 A1 | 1/2013 | Nagakubo et al. |
| 2013/0066533 A1 | 3/2013 | Moore et al. |
| 2013/0110359 A1 | 5/2013 | Febrer et al. |
| 2013/0180605 A1 | 7/2013 | Matsushima |
| 2013/0241272 A1 | 9/2013 | Kim et al. |
| 2014/0062048 A1 | 3/2014 | Schlangen et al. |
| 2015/0041232 A1 | 2/2015 | Takatsuka et al. |
| 2015/0096819 A1 | 4/2015 | Grajkowski et al. |
| 2015/0191161 A1 | 7/2015 | Sagayama et al. |
| 2015/0344009 A1* | 12/2015 | Hagspiel .............. B60T 8/3225 303/119.1 |
| 2016/0047450 A1 | 2/2016 | Steidl et al. |
| 2016/0298744 A1 | 10/2016 | Bujold |
| 2018/0065465 A1 | 3/2018 | Ward |
| 2018/0141543 A1 | 5/2018 | Krosschell et al. |
| 2018/0211454 A1 | 7/2018 | Carlson et al. |
| 2018/0257726 A1 | 9/2018 | Bagnariol |
| 2018/0265056 A1* | 9/2018 | Hasegawa .............. B60T 8/1755 |
| 2018/0281764 A1* | 10/2018 | Pongo .................. B60T 7/08 |
| 2018/0304962 A1* | 10/2018 | Adachi ................ B60T 13/662 |
| 2019/0152493 A1 | 5/2019 | Pongo et al. |
| 2019/0337497 A1 | 11/2019 | Scheuerell et al. |
| 2021/0009097 A1* | 1/2021 | Pongo .................. B60K 17/354 |

FOREIGN PATENT DOCUMENTS

| | | |
|---|---|---|
| CN | 102730122 A | 10/2012 |
| CN | 103158692 A | 6/2013 |
| DE | 3803563 A1 | 8/1989 |
| DE | 3901923 A1 | 9/1990 |
| DE | 4329140 C1 | 12/1994 |
| DE | 4330121 A1 | 3/1995 |
| DE | 19501760 A1 | 7/1996 |
| DE | 19613903 A1 | 10/1997 |
| DE | 19731650 A1 | 1/1999 |
| DE | 102004034226 A1 | 3/2005 |
| DE | 102010031140 | 1/2012 |
| EP | 0175843 A2 | 4/1986 |
| EP | 0422515 A2 | 4/1991 |
| EP | 1520763 A1 | 4/2005 |
| EP | 1568561 A1 | 8/2005 |
| EP | 1679243 A1 | 7/2006 |
| EP | 1702822 | 9/2006 |
| EP | 1783018 A1 | 5/2007 |
| EP | 1842755 A1 | 10/2007 |
| EP | 2075168 A2 | 7/2009 |
| EP | 2075169 A2 | 7/2009 |
| EP | 2213536 A1 | 8/2010 |
| EP | 2216218 A1 | 8/2010 |
| EP | 2284071 A1 | 2/2011 |
| EP | 2311704 A1 | 4/2011 |
| EP | 2540587 A1 | 1/2013 |
| EP | 2548792 A1 | 1/2013 |
| EP | 2565090 A1 | 3/2013 |
| EP | 2574511 A1 | 4/2013 |
| EP | 2591962 A1 | 5/2013 |
| EP | 2765068 A1 | 8/2014 |
| EP | 2868958 | 5/2015 |
| EP | 2915729 A1 | 9/2015 |
| EP | 2977281 A1 | 1/2016 |
| FR | 2843349 A1 | 2/2004 |
| ID | 201202332 | 10/2011 |
| ID | 201303965 | 11/2012 |
| IN | 201103052 | 1/2013 |
| IN | 201002229 | 10/2013 |
| IN | 201202995 | 4/2014 |
| IN | 201202996 | 4/2014 |
| IN | 201203002 | 4/2014 |
| IN | 201500699 | 1/2016 |
| JP | 11-314589 A | 11/1999 |
| JP | 11-314590 A | 11/1999 |
| JP | 11-314591 A | 11/1999 |
| JP | H11-311265 | 11/1999 |
| JP | 2000-006779 A | 1/2000 |
| JP | 2000-071962 | 3/2000 |
| JP | 2000-142343 A | 5/2000 |
| JP | 2001-253383 A | 9/2001 |
| JP | 2001-260848 A | 9/2001 |
| JP | 2002-029403 A | 1/2002 |
| JP | 2002-067913 A | 3/2002 |
| JP | 2002-193175 | 7/2002 |
| JP | 2005-059629 A | 3/2005 |
| JP | 2005-178632 A | 7/2005 |
| JP | 2005-238901 A | 9/2005 |
| JP | 2006-175993 A | 7/2006 |
| JP | 2006-192980 A | 7/2006 |
| JP | 2007-008375 A | 1/2007 |
| JP | 2007-069870 A | 3/2007 |
| JP | 2007-076555 A | 3/2007 |
| JP | 2007-112155 A | 5/2007 |
| JP | 2007-296908 A | 11/2007 |
| JP | 2010-013067 A | 1/2010 |
| JP | 2010-058699 A | 3/2010 |
| JP | 2010-076511 A | 4/2010 |
| JP | 4451302 B2 | 4/2010 |
| JP | 2010228543 A * | 10/2010 |
| JP | 2011-051417 A | 3/2011 |
| JP | 2011-051433 A | 3/2011 |
| JP | 2011-079351 A | 4/2011 |
| JP | 2011-088631 A | 5/2011 |
| JP | 4739156 B2 | 8/2011 |
| JP | 2012-096753 A | 5/2012 |
| JP | 2012-210891 A | 11/2012 |
| JP | 2012-245843 A | 12/2012 |
| JP | 2013-014199 A | 1/2013 |
| JP | 2013-071589 A | 4/2013 |
| JP | 5189337 B2 | 4/2013 |
| JP | 2013-103524 A | 5/2013 |
| JP | 2013-103693 A | 5/2013 |
| JP | 2013-136356 A | 7/2013 |
| JP | 2014-031138 A | 2/2014 |
| JP | 2014-148308 | 8/2014 |
| JP | 5667542 B2 | 2/2015 |
| JP | 5685172 B2 | 3/2015 |
| JP | 5715536 B2 | 5/2015 |
| JP | 5751989 B2 | 7/2015 |
| JP | 5764025 B2 | 8/2015 |
| JP | 2015-178335 A | 10/2015 |
| JP | 5816715 B2 | 11/2015 |
| JP | 5882803 B2 | 3/2016 |
| JP | 2016-137872 A | 8/2016 |
| JP | 5972706 B2 | 8/2016 |
| KR | 10-1479827 B1 | 1/2015 |
| TW | 484550 | 4/2002 |
| TW | 243401 | 9/2004 |
| TW | 247468 | 10/2004 |
| WO | 96/02409 A1 | 2/1996 |
| WO | 2004/002769 A1 | 1/2004 |
| WO | 2004/022395 A1 | 3/2004 |
| WO | 2011/027441 A1 | 3/2011 |
| WO | 2018/183452 A1 | 10/2018 |
| WO | 2019/213417 A1 | 11/2019 |

OTHER PUBLICATIONS

Invitation to Restrict or Pay Additional Fees, and Where Applicable, Protest Fee, issued by the European Patent Office, dated Apr. 4,

(56) References Cited

OTHER PUBLICATIONS 2018 for International Patent Application No. PCT/US2018/024775; 4 pages.
International Preliminary Report on Patentability issued by the International Searching Authority, dated Aug. 7, 2019, for International Patent Application No. PCT/US2018/024775; 19 pages.
Office Action issued by the Canadian Intellectual Property Office, dated Jul. 30, 2020, for Canadian Patent Application No. 3,055,074; 3 paegs.
International Preliminary Report on Patentability issued by the International Preliminary Examining Authority, dated Jan. 30, 2020, for International Patent Application No. PCT/US2018/062179; 18 pages.
International Preliminary Report on Patentability received for PCT Patent Application No. PCT/EP2016/055734, dated Sep. 28, 2017, 18 pages.
International Preliminary Report on Patentability received for PCT Patent Application No. PCT/US2007/011268, dated Aug. 12, 2008, 11 pages.
International Search Report and Written Opinion received for PCT Patent Application No. PCT/US2007/011268, dated Feb. 22, 2008, 7 pages.
International Search Report and Written Opinion received for PCT Patent Application No. PCT/US2018/062179, dated Feb. 13, 2019, 17 pages.
International Search Report issued by the International Searching Authority, dated Aug. 20, 2019, for International Patent Application No. PCT/US2019/030432; 4 pages.
U.S. Patent Application filed on Jul. 27, 2020 by Harry Pongo entitled "Anti-Lock Brake System for All-Terrain Vehicle", U.S. Appl. No. 16/939,259.
Written Opinion of the International Searching Authority, dated Aug. 20, 2019, for International Patent Application No. PCT/US2019/030432; 6 pages.

\* cited by examiner

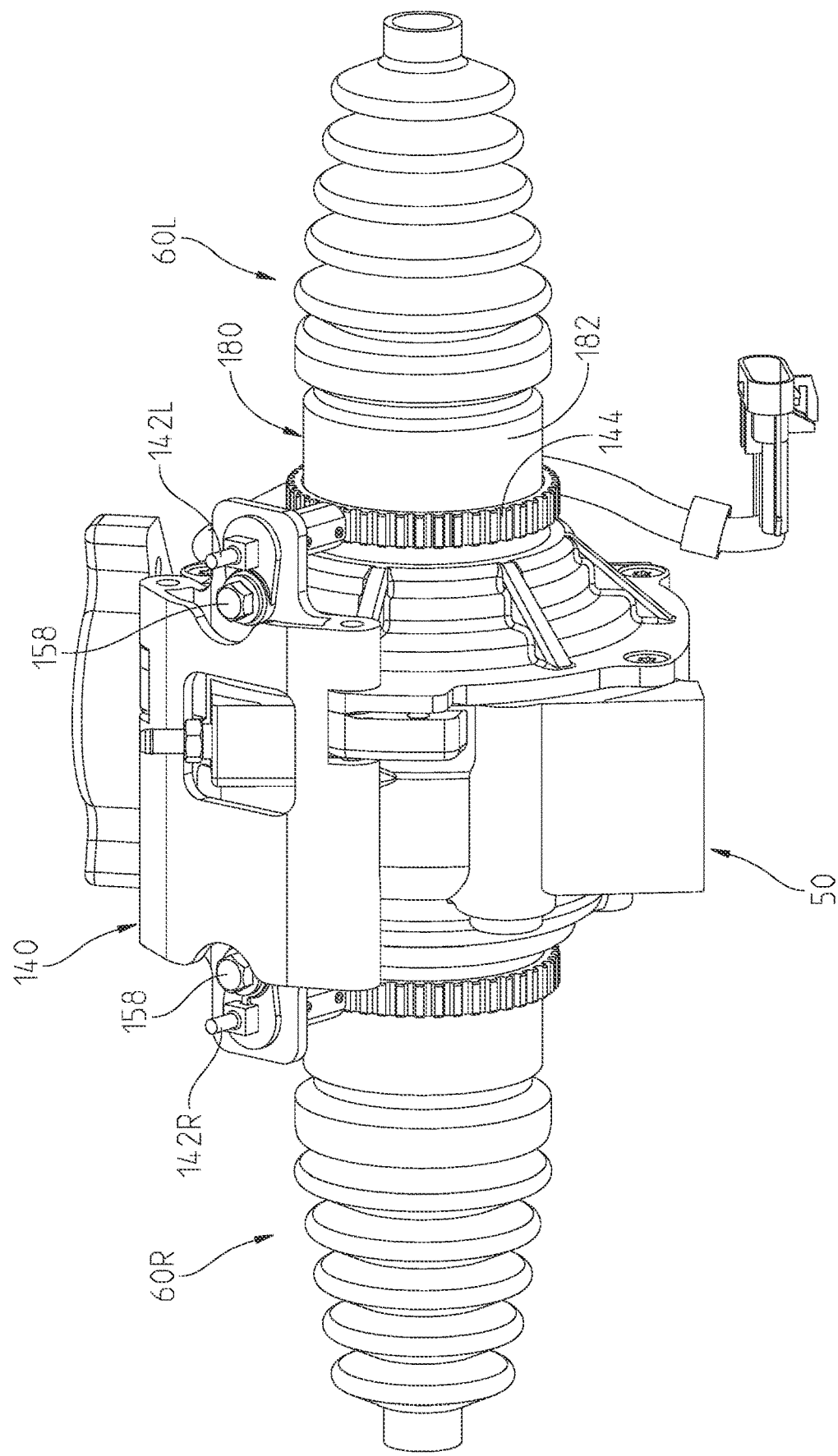

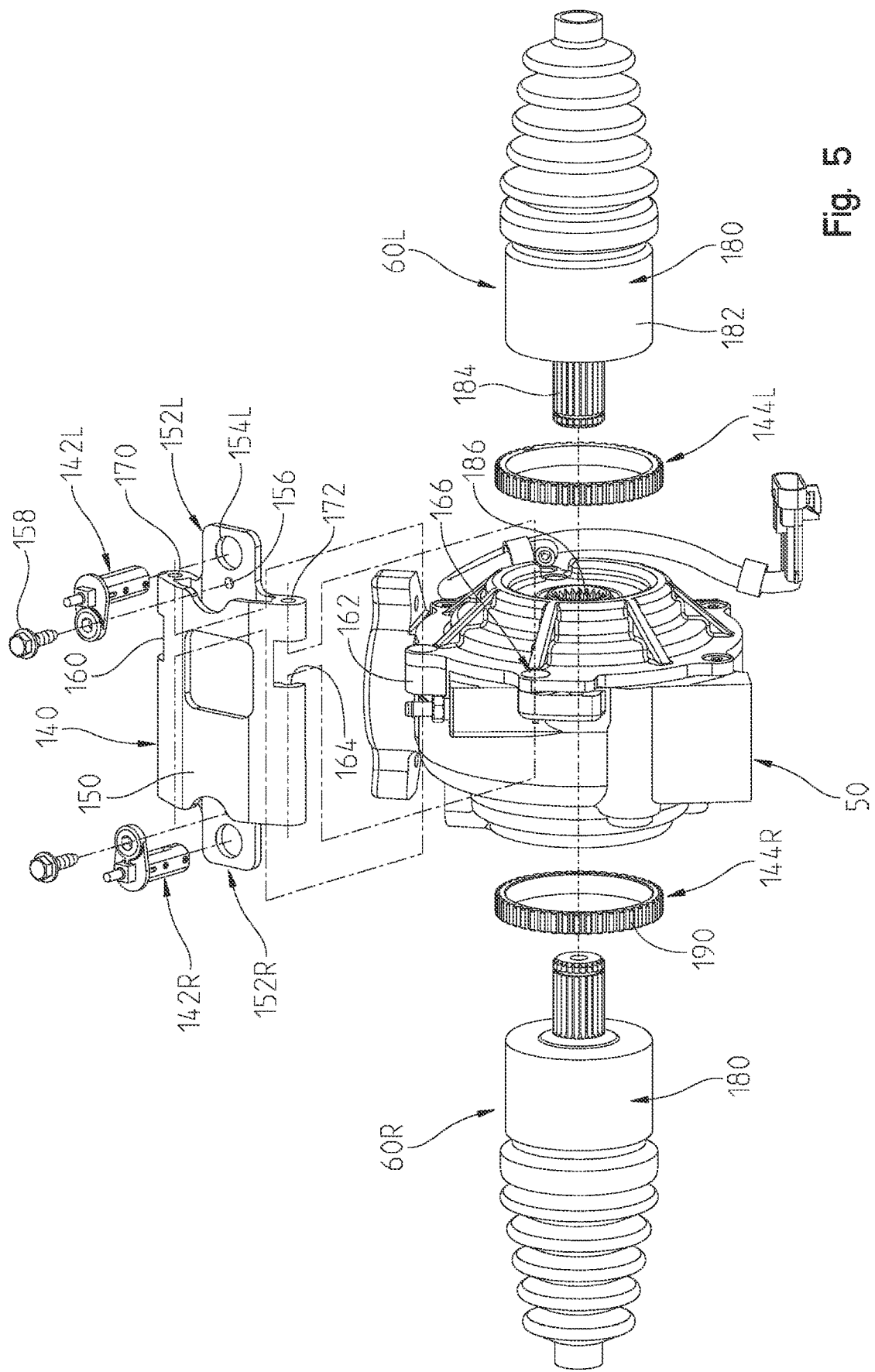

ANTI-LOCK BRAKE SYSTEM FOR ALL-TERRAIN VEHICLE

CROSS-REFERENCE TO RELATED APPLICATIONS

The present application is a continuation of U.S. patent application Ser. No. 15/471,469, filed Mar. 28, 2017, the entire disclosure of which is hereby incorporated herein by reference.

BACKGROUND

The present application relates to a braking system for all-terrain vehicle and more particularly to anti-lock braking systems.

Braking systems are known for ATVs having dual inputs to control braking. AN ATV has a hand controlled master cylinder and a foot controlled master cylinder as shown in U.S. Pat. No. 7,695,074, the subject matter of which is incorporated herein by reference.

SUMMARY

In one embodiment, an all-terrain vehicle comprises a frame; ground engaging members supporting the frame; a powertrain supported by the frame, including a first final drive drivingly coupled to at least some of the ground engaging members to power first ground engaging members, and a second final drive drivingly coupled to at least some of the ground engaging members to power second ground engaging members. A braking system comprises an anti-lock braking control module; a first brake master cylinder hydraulically coupled to the anti-lock braking control module; a first brake actuator coupled to the first brake master cylinder; a brake caliper coupled to at least some of the ground engaging members; wherein the first brake master cylinder upon actuation provides anti-lock braking to either the first or second ground engaging members.

In another embodiment, an all-terrain vehicle comprises a frame; ground engaging members supporting the frame; and a braking system. The braking system comprises an anti-lock braking control module; a first brake master cylinder hydraulically coupled to the anti-lock braking control module; a first brake actuator coupled to the first brake master cylinder; a second brake master cylinder hydraulically coupled to the anti-lock braking control module; a second brake actuator coupled to the second brake master cylinder; a brake caliper coupled to at least some of the ground engaging members; wherein the first brake master cylinder upon actuation provides anti-lock braking to either the first or second ground engaging members, and wherein the second brake mast cylinder upon actuation provides anti-lock braking to either the first or second ground engaging members.

In yet another embodiment, an all-terrain vehicle comprises a frame; ground engaging members supporting the frame; a powertrain supported by the frame, including a first final drive drivingly coupled to at least some of the ground engaging members to power first ground engaging members, and a second final drive drivingly coupled to at least some of the ground engaging members to power second ground engaging members; stub shafts extending from the first and second final drives to the first and second ground engaging members; and a speed monitor for at least some of the ground engaging members, the speed monitor comprises a gear ring positioned on an exterior surface of the stub shaft and a speed pickup positioned adjacent to the gear ring.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

The invention will now be described in relation to the drawing figures, where:

FIG. 4 shows the final drive of FIG. 3 less the suspension system;

FIG. 5 shows an exploded view of the final drive of FIG. 4;

DETAILED DESCRIPTION OF THE DRAWINGS

Figure 1:
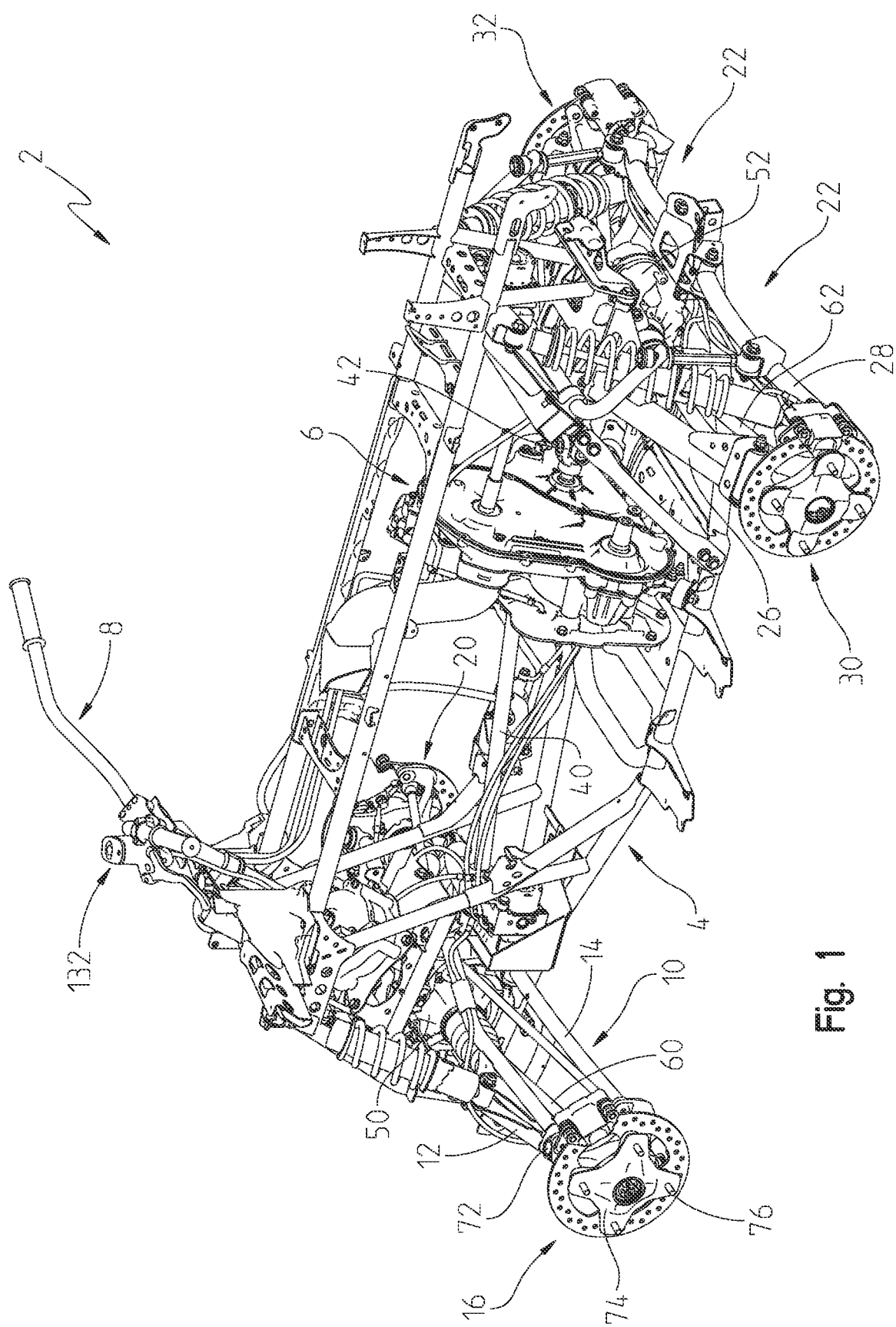
FIG. 1 is a left rear perspective view of an all-terrain vehicle frame showing the suspension and braking system.

With reference first to FIG. 1, an ATV is shown at 2 where the ATV is shown with the wheels, seat and other essential components removed for the clarity of the suspension and braking system. As shown in FIG. 1, ATV 2 includes a frame 4 which supports a powertrain 6 where the ATV has a steering system 8 to control the steering of the ATV, as known in the art. The ATV has front suspensions at 10 which include upper and lower control arms 12, 14 where the front left suspension 10 supports a left front wheel mount 16, and the right front suspension 10 supports a right front wheel mount 20. In a like manner, a left rear suspension is shown at 22 where the rear suspension 22 includes an upper control arm 26 and a lower control arm 28. As shown, left rear suspension 22 supports a left rear wheel mount 30 and the right rear suspension 22 supports a right rear wheel mount 32.

Powertrain 6 is coupled to the front rear mount 16, 20 by way of a front drive shaft at 40 and to the rear wheel mounts 30, 32 by way of a drive shaft 42. Front drive shaft 40 is coupled to a front final drive at 50 and rear drive shaft 42 is coupled to a rear final drive 52. Front and rear final drives 50, 52 could be differentials. Front final drive 50 is coupled to wheel mounts 16 by way of front stub shafts 60 and rear final drive 52 is coupled to rear wheel mounts 30, 32 by way of stub shafts 62.

Figure 2:
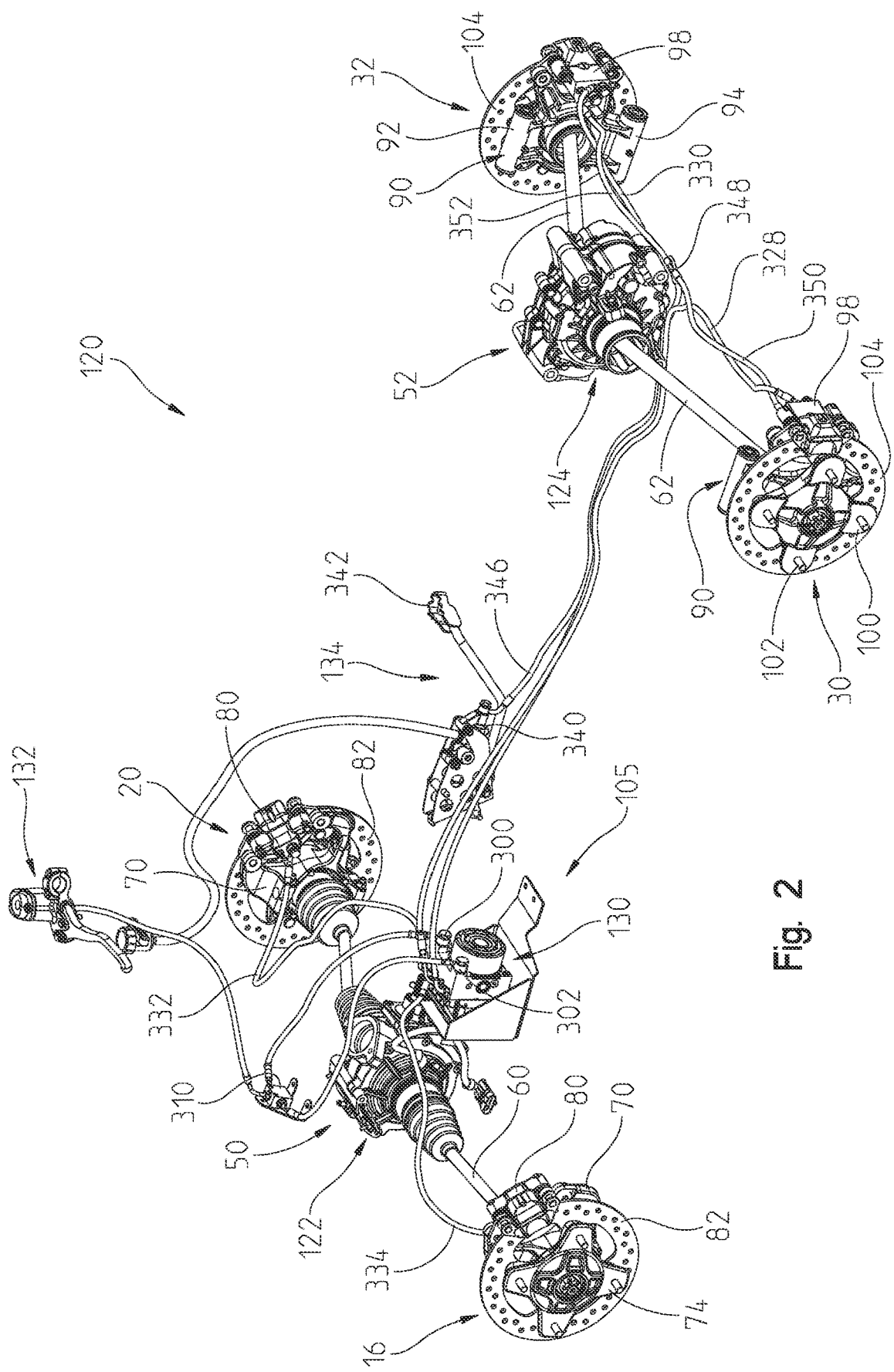
FIG. 2 shows the braking system of the all-terrain vehicle of FIG. 1.

With reference now to FIG. 2, front wheel mounts 16, 20 includes steering knuckles 70 which couple to a front suspension 10 by way of ball joints 72 (FIG. 1). Front wheel mounts 16, 20 further include wheel hubs 74 which include wheel studs 76 which allow attachment of wheels to the hub 74, as known in the art. Steering knuckles 70 retain brake calipers 80 thereto, which cooperate with brake discs 82 to brake the vehicle.

In a like manner, rear wheel mounts 30, 32 include rear knuckles 90 which couple to the upper and lower suspension arms 26, 28 at upper and lower couplers 92, 94 as best shown in FIG. 2. Knuckles 90 retain brake calipers 98 thereto and rear wheel hubs 100 couple to the knuckles 90 and have rear wheel studs 102 for retaining rear wheels to the wheel hub 100. Rear wheel mounts 30, 32 further 4 include rear brake discs 104 which cooperate with rear calipers 98. Thus, front final drive 50 drives front wheel hubs 74 by way of stub shafts 60 and rear final drive 52 drives rear wheel hubs 100 by way of rear stub shafts 62.

Figure 3:
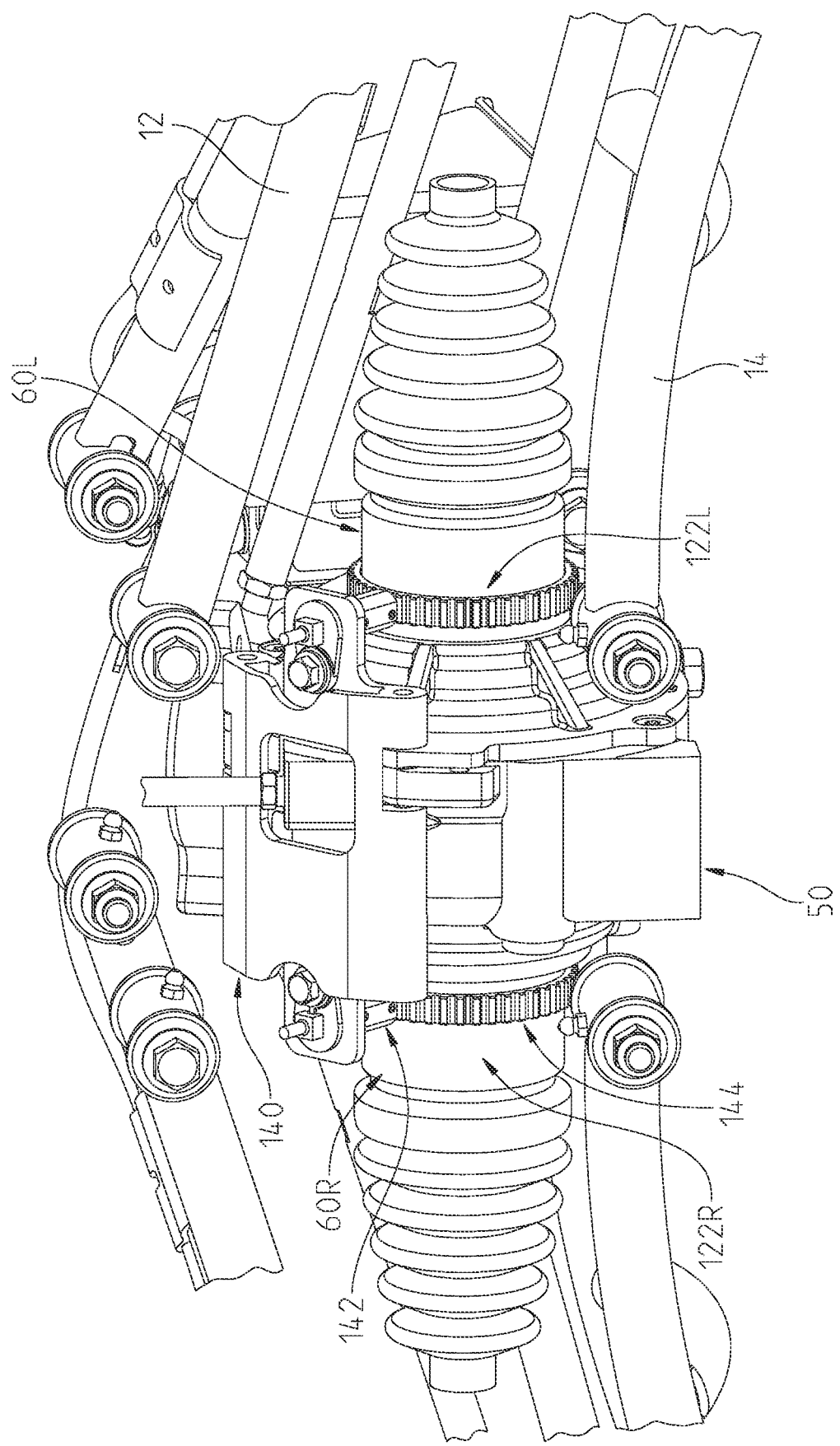
FIG. 3 shows a front perspective view of the front final drive of the system shown in FIG. 2.

With reference still to FIG. 2, ATV 2 includes a braking control system 105 including an anti-lock brake system (ABS) for controlling the braking of the ATV 2. Braking control system 105 includes front wheel speed sensors 122, rear wheel speed sensors 124, ABS hydraulic control unit 130, hand-controlled master cylinder 132 and foot-controlled master cylinder 134. As described herein, control unit 130 allows multiple variations of ABS control to the front and rear brake system through either or both of the hand 132 or foot-controlled master cylinders. It should also be apperceived that wheel speed sensors 122, 124 provide input to the control unit 130 for the various wheel speeds in order that ABS control unit is able to control individual wheel speeds for ABS unit. With reference now to FIGS. 3-5, front wheel speed sensors 122 will be described in greater detail.

With reference first to FIG. 3, while the speed sensors 122 are identical, it should be understood that speed sensors 122 operate independently of each other as the stub shafts 60, and therefore the front wheels, may be operating at different speeds. Thus, for each wheel a speed sensor 122 is provided to inform the control unit 130 of the speed of each front wheel. Thus in the description that follows, a designator for the reference numerals may be sued for "L" designating the left-hand side and "R" for the right-hand side.

Thus as shown in FIGS. 3 and 4, left-hand stub shaft 60L includes a speed sensor assembly 122L and the right-hand side stub shaft 60R includes a speed sensor assembly 122R. Speed sensor assemblies 122 further include a mounting bracket 140, speed sensors 142 and gear rings 144. With reference to FIG. 5, bracket 140 includes a main body portion 150 having a left wing portion 152L and a right wing portion 152R for mounting of respective sensors 142L and 142R. Wings 152 include apertures at 154 to receive sensors 142 and a threaded aperture at 156 to receive a fastener 158 which retains the sensors 142 in position on the bracket 140. Main body portion 152 includes an upper notch at 160 which is received over mounting ear 162 and bracket 140 includes a lower notch at 164 which is received over mounting ear 166. Thus, a fastener could be received through bracket 140 from the left to the right as viewed in FIG. 5, to be received through the bracket 140 and into threaded apertures 170, 172 to retain the bracket 140 and the sensors 142 to the mount ears 162, 166.

With reference still to FIG. 5, stub shafts 60L and 60R include a drive coupling at 180 including an outer surface at 1282 and a splined shaft at 184. It should be appreciated that shaft 184 couples with output 186 of front final drive 50. Gears 144 are positioned on outer surface 182 of coupling 180 and are held in position relative to the stub shaft 60 and therefore rotate with the stub shaft 60. Gears 144 include a plurality of teeth at 190 which cooperate with sensors 142 to determine the speed of each of the stub shafts 60L, 60R. It should be realized that the sensors 142 are positioned in proximity to the teeth 190 but do not contact the teeth 190, rather the sensors count the teeth as the teeth pass the sensor over a specific time period to calculate an angular velocity. It should be appreciated that sensors 142L and 142R could be speed sensors such as Hall Effect speed sensors. Gears 144 could be coupled to their corresponding couplers 180 by way of fasteners, welding, adhesives, press-fitting or through a thermal expansion process which locks the gear 144 to the surface 182.

Figure 5A:
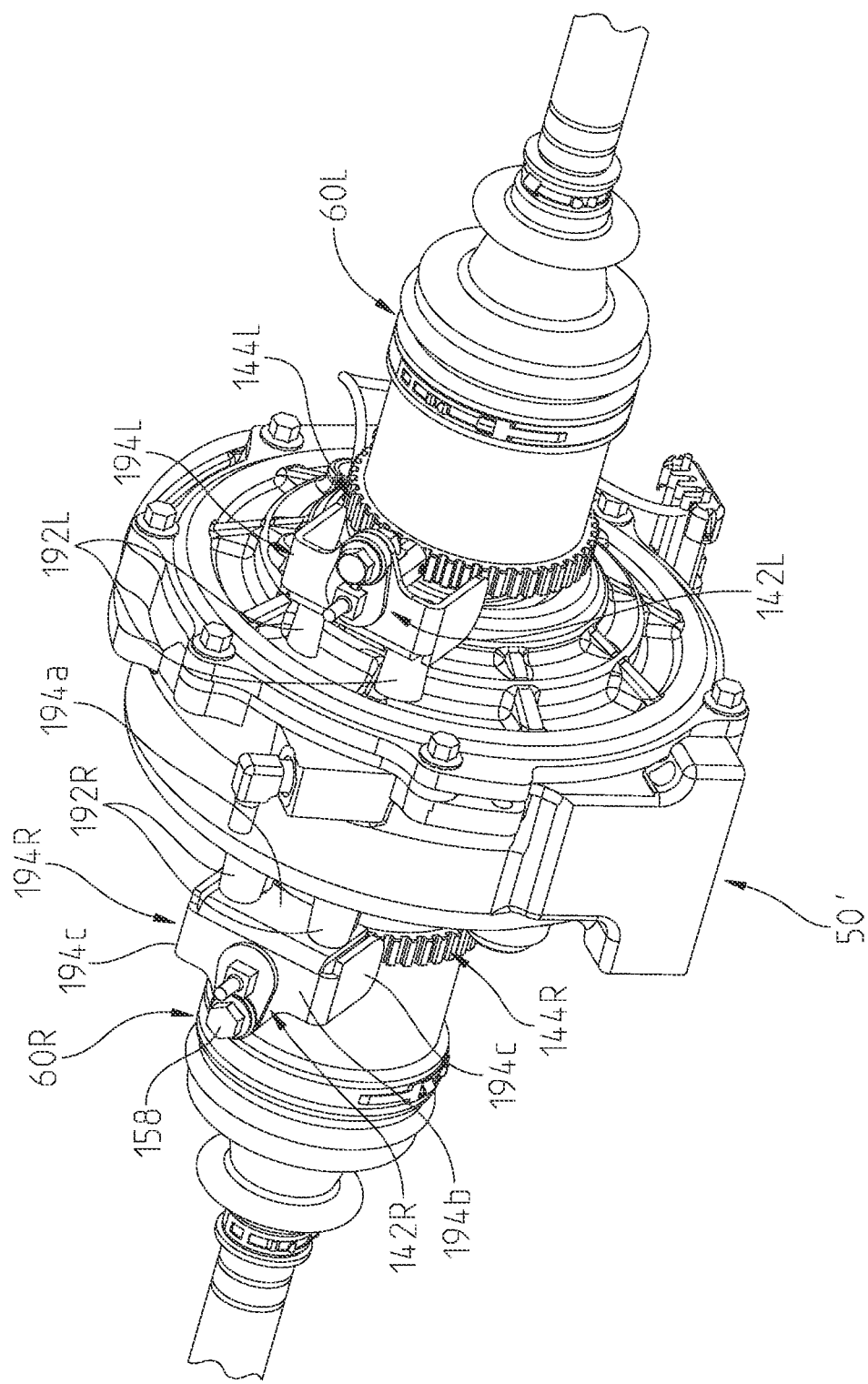
FIG. 5A shows a front perspective view of an alternate bracket for the front final drive of the system shown in FIG. 2.

With reference to FIG. 5A, front final drive 50' could have threaded posts 192L and 192R, and the mounting bracket could be in the form of a two-piece bracket comprising 194L and 194R. The mounting brackets 194L and 194R could each include a back wall 194a, top wall 194b and side walls 194c. Fasteners would extend through back walls 194a and thread into threaded posts 192L and 192R. Sensors 142L and 142R would be coupled to top wall 194b by way of fasteners 158.

Figure 6:
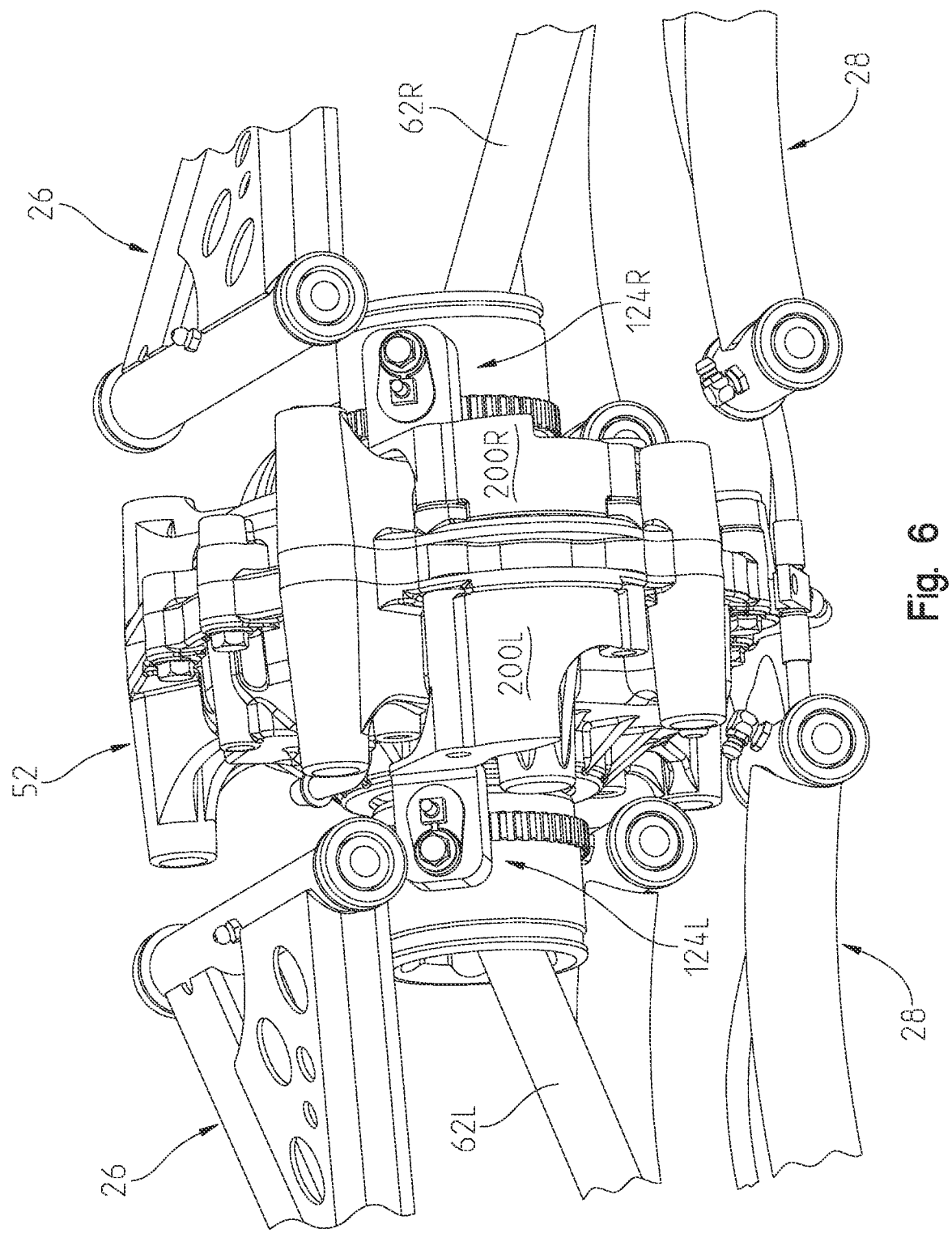
FIG. 6 shows a rear perspective view of the rear final drive.
Figure 7:
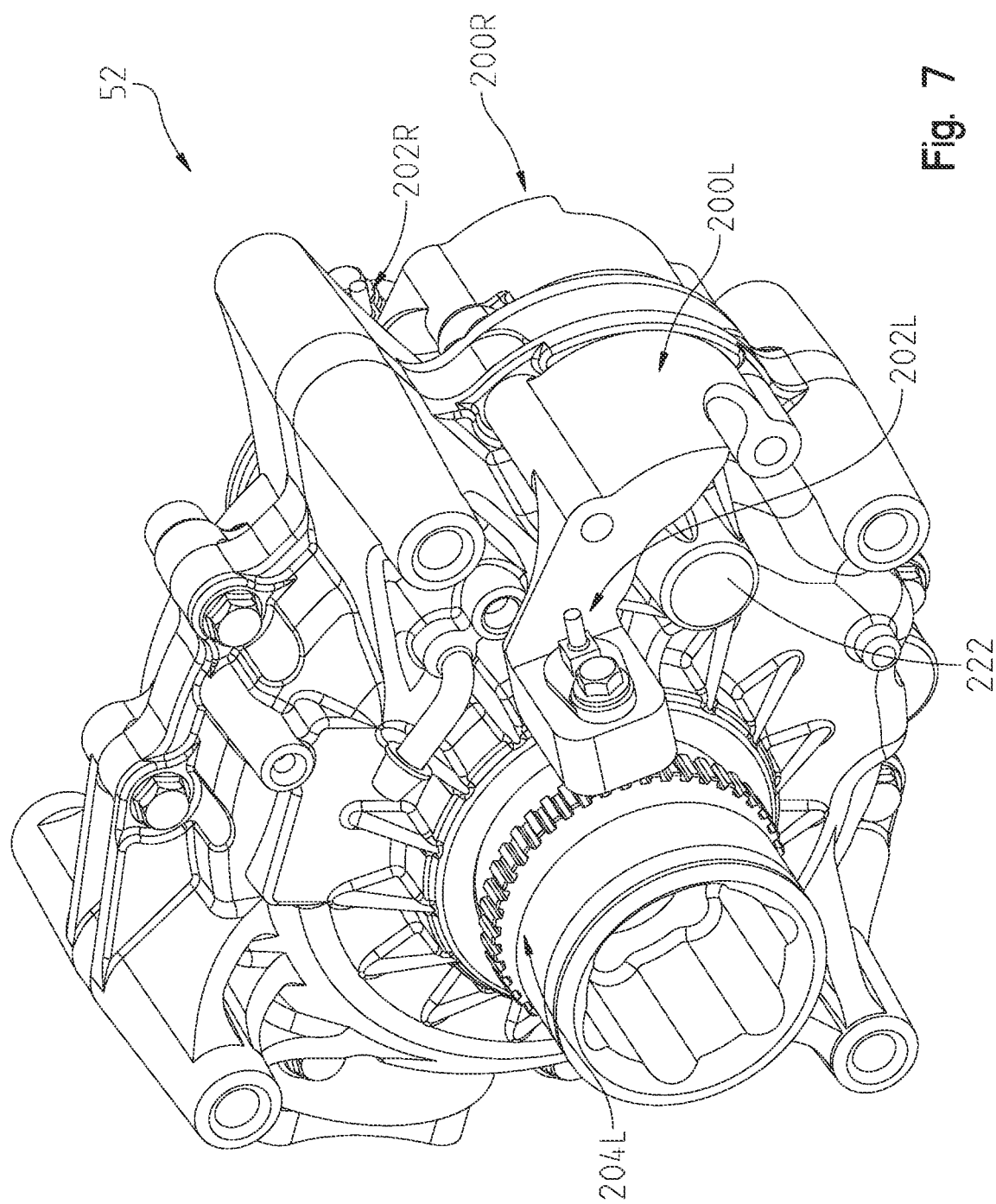
FIG. 7 shows a left rear perspective view of the final drive of FIG. 6 less the suspension system.
Figure 8:
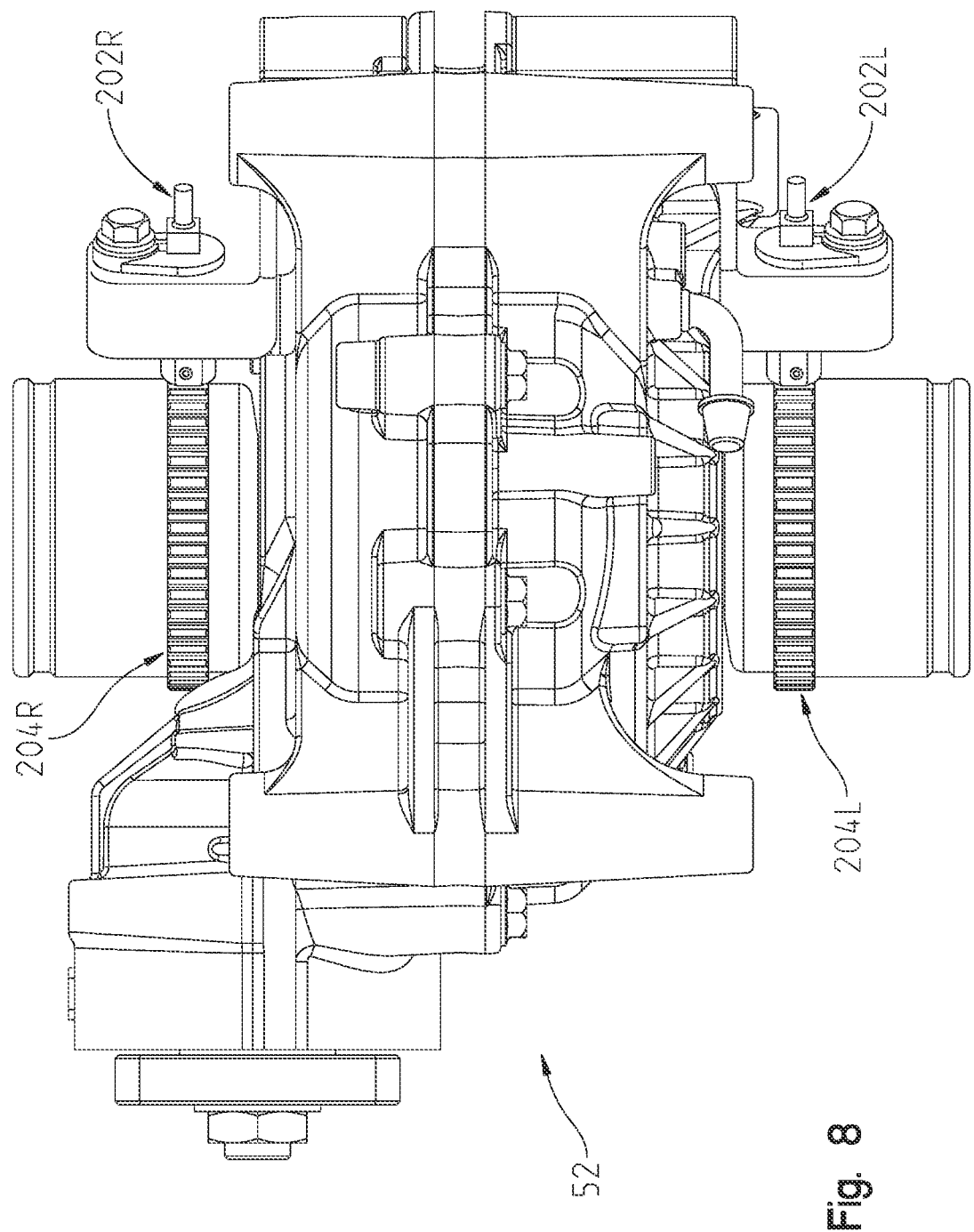
FIG. 8 shows a top view of the final drive of FIG. 7.
Figure 9:
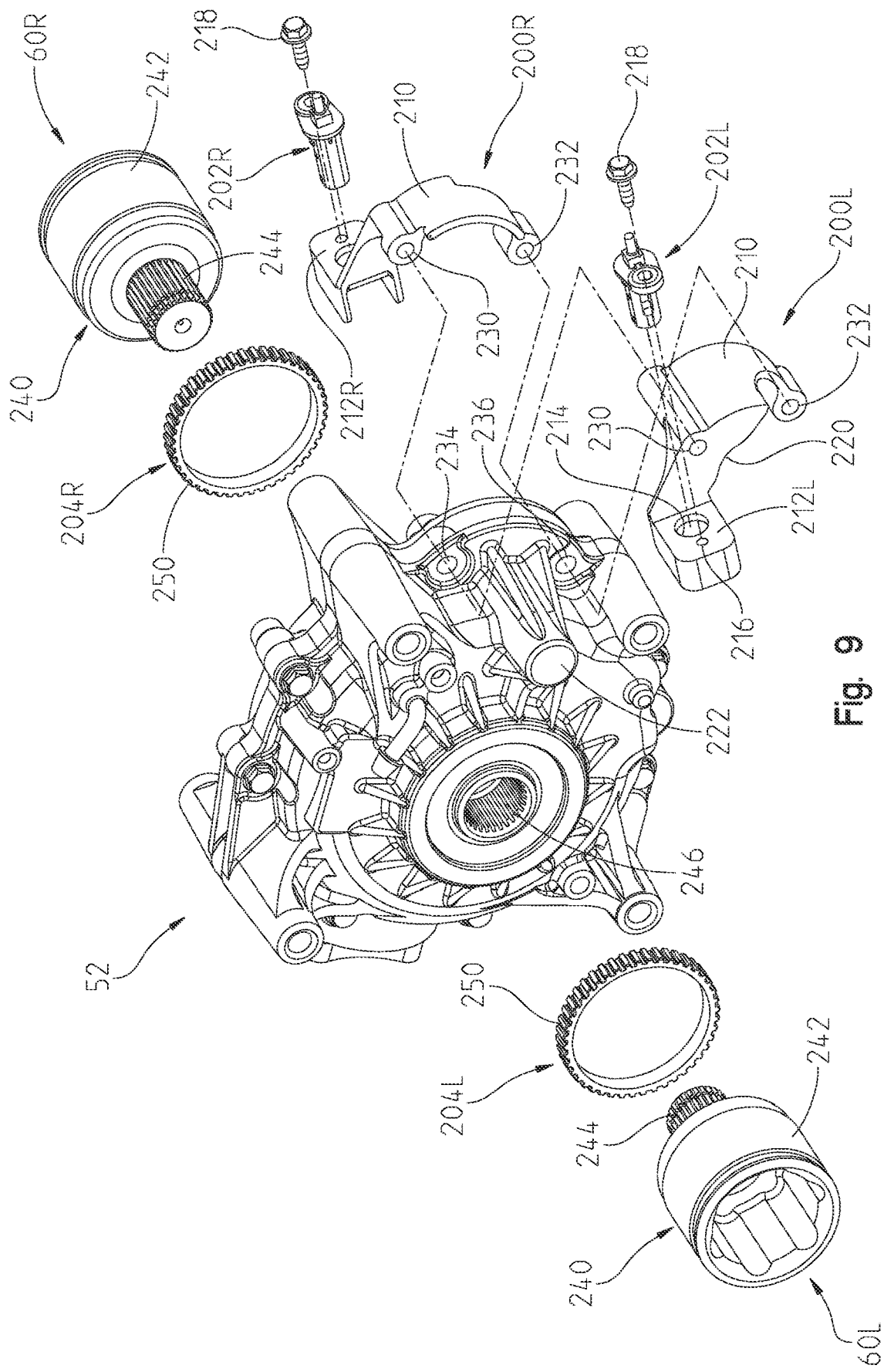
FIG. 9 shows an exploded view of the final drive of FIG. 7.

With reference now to FIGS. 6-9, the rear speed sensor assembly 124 will be described in further detail. Thus as shown in FIG. 6, left-hand stub shaft 62L includes a speed sensor assembly 124L and the right-hand side stub shaft 62R includes a speed sensor assembly 124R. Speed sensor assemblies 124 further include mounting brackets 200L and 200R, speed sensors 202 and gear rings 204. With reference to FIG. 9, brackets 200 include a main body portion 210 having a left wing portion 212L and a right wing portion 212R for mounting of respective sensors 202L and 202R. Wings 212 include apertures at 214 to receive sensors 202 and a threaded aperture at 216 to receive a fastener 218 which retains the sensors 202 in position on the brackets 200. Main body portion 210 includes an notch at 220 which is received over ear 222. Thus, a fastener could be received through bracket 2020 from the left to the right as viewed in FIG. 9, to be received through brackets 200L and 200R and through apertures 230, 232, and through apertures 234, 236 of final drive 52 to retain the brackets 200 and the sensors 202 in position adjacent to rings 204.

With reference still to FIG. 9, stub shafts 60L and 60R include a drive coupling at 240 including an outer surface at 242 and a splined shaft at 244. It should be appreciated that shaft 244 couples with output 246 of rear final drive 52. Gear rings 204 are positioned on outer surface 242 of coupling 240 and are held in position relative to the stub shaft 62 and therefore rotate with the stub shaft 62. Gears 204 include a plurality of teeth at 250 which cooperate with sensors 202 to determine the speed of each of the stub shafts 62L, 62R. It should be realized that the sensors 202 are positioned in proximity to the teeth 250 but do not contact the teeth 250, rather the sensors 202 count the teeth 250 as the teeth 250 pass the sensor 202 over a specific time period to calculate an angular velocity. It should be appreciated that sensors 202L and 202R could be speed sensors such as Hall Effect speed sensors. Gears 204 could be coupled to their corresponding couplers 240 by way of fasteners, adhesives or through a thermal expansion process which locks the gear 204 to the surface 242.

Figure 10:
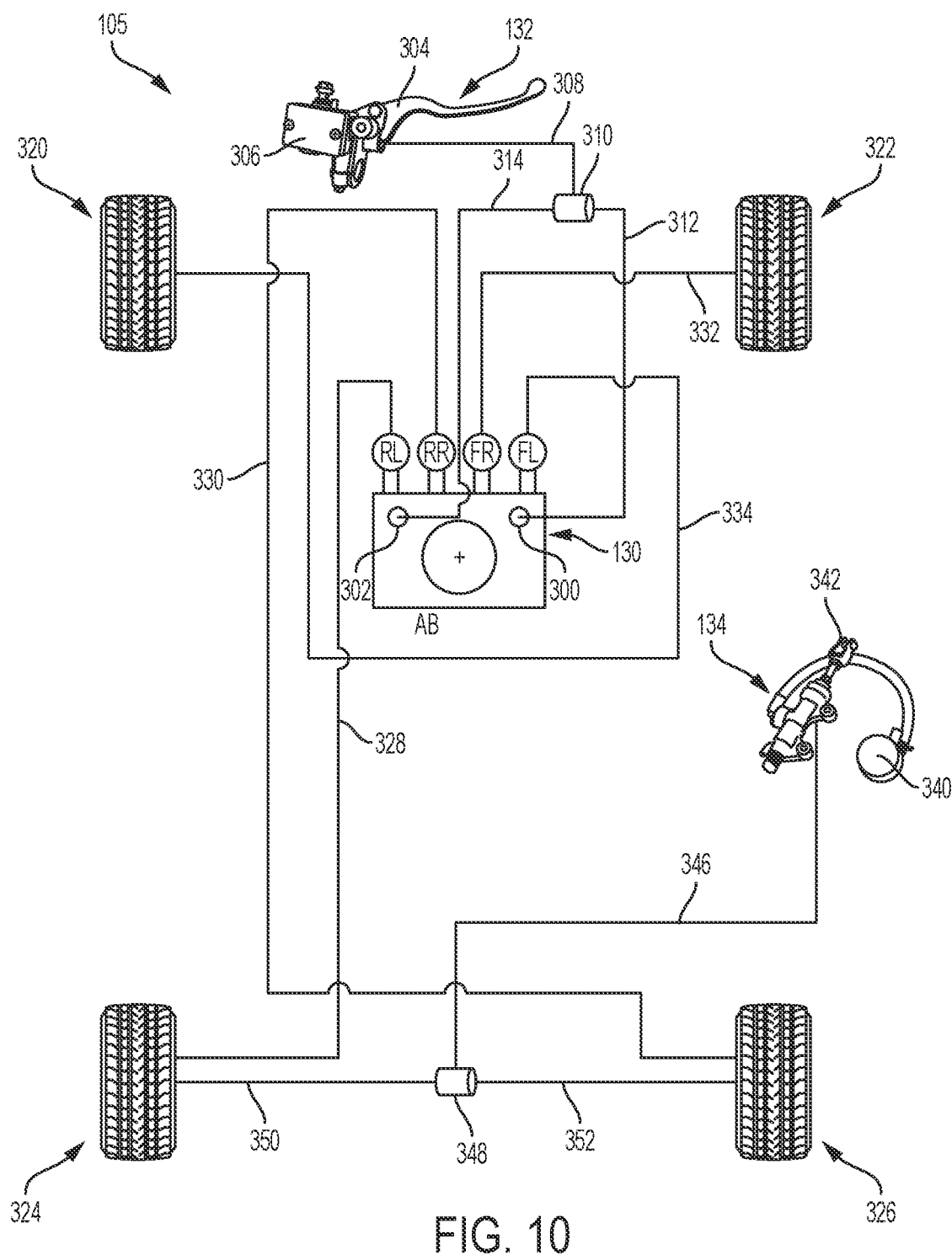
FIG. 10 shows a hydraulic schematic view of the braking control system of FIG. 2.

With reference now to FIGS. 2 and 10, the hydraulic control of the embodiment of FIG. 2 will be described. As will be appreciated, FIGS. 2 and 10 depict braking system 105 having ABS braking from the hand-controlled master cylinder 132 to all four wheels, whereas the foot-controlled master cylinder 134 controls only the rear brakes through a normal braking cycle. As shown best in FIG. 10, the controller 130 includes four outputs labelled RL (rear left); RR (right rear); FR (front right) and FL (front left); and two inputs 300 for the front and input 302 for the rear brakes. Thus, hand-controlled master cylinder 132 includes an activation member 304 in the way of a hand lever which controls cylinder 306.

Cylinder 306 is coupled to hydraulic line 308 which couples to a splitter 310 which directs hydraulic fluid through hydraulic line 312 to input 300 and through line 314 to input 302. Thus upon activation of the lever 304, hydraulic pressure is input to both inputs 300 and 302, which provides hydraulic pressure through all four channels RL, RR, FR and FL to provide four channel ABS braking to all four wheels 320-326. More particularly, hydraulic pressure is introduced through hydraulic line 328 to rear left wheel 324; through hydraulic line 330 for rear right wheel 326; through hydraulic line 332 for front right wheel 322 and hydraulic line 334 to control front left wheel 320. Thus, four channel ABS is braking provided through the hand-controlled master cylinder 132.

With respect to the foot-controlled master cylinder 134, cylinder 340 is provided having an actuator at 342. A hydraulic line 346 is provided out of cylinder 340 which inputs to a splitter 348 which provides a first line 350 to the left rear wheel 324 and a second line 352 to the right rear wheel 326. Thus, standard rear wheel only braking is provided through the foot-controlled master cylinder 134. It should be appreciated that multiple variations of the ABS braking system is provided by utilizing the identical controller 130, hand-controlled master cylinder 132 and foot-controlled master cylinder 134. It should be understood in the embodiment of FIG. 2 that the rear calipers 98 are dual input calipers.

Figure 11:
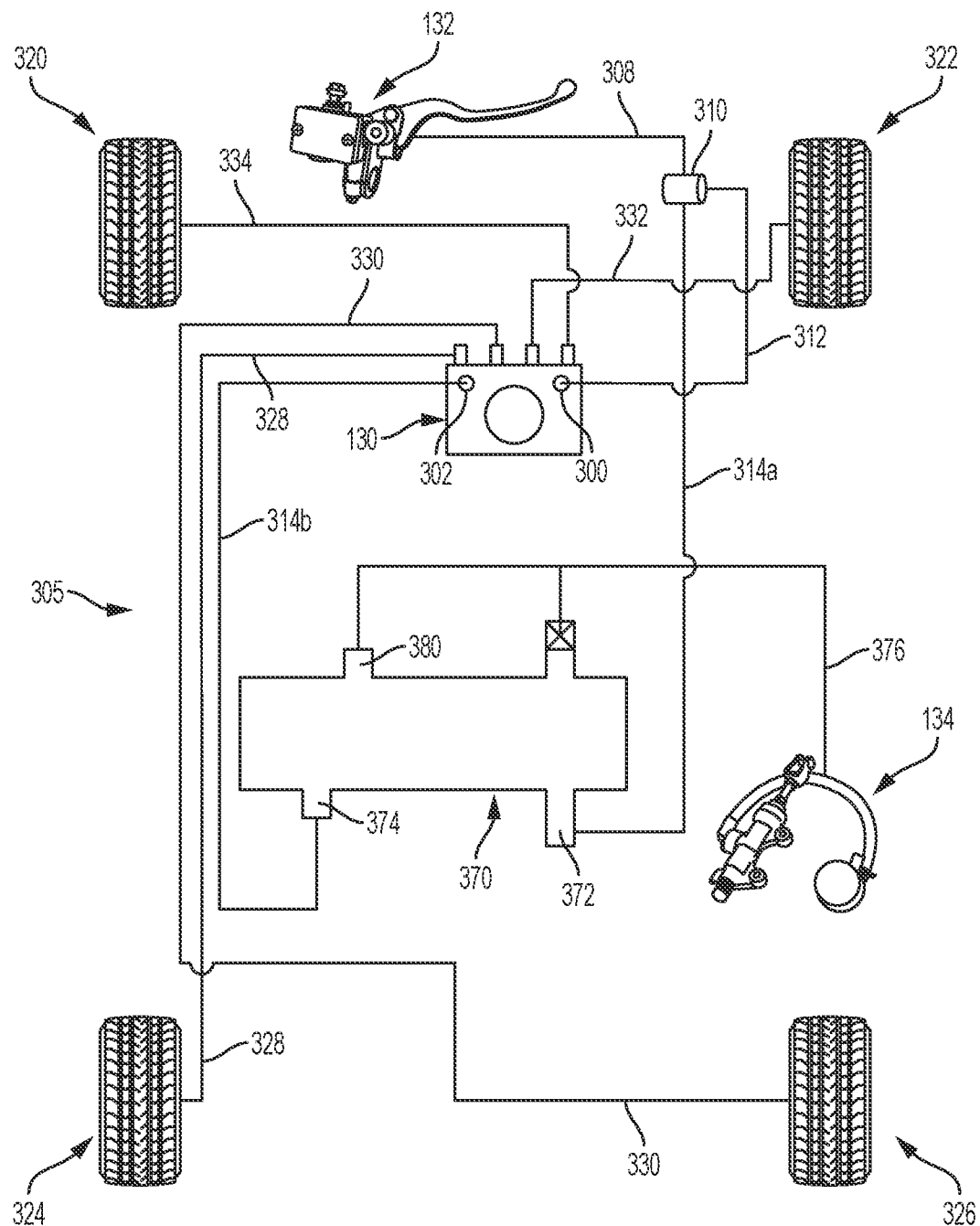
FIG. 11 shows an alternate hydraulic schematic view of a braking control system having 4 wheel ABS braking from the hand controlled master cylinder and rear wheel ABS braking from the foot controlled master cylinder.

With reference now to FIG. 11, another embodiment of a braking control system is disclosed at 305 where four channel ABS braking is provided by the hand-controlled master cylinder 132 and rear wheel ABS braking is provided by the foot-controlled master cylinder 134. As shown, hand-controlled master cylinder 132 is input through line 308 in a similar manner as mentioned above, to splitter 310. Line 312 extends from splitter to the input 300 in a like manner to that of FIG. 10, to provide ABS braking to the front wheels 320, 322 through lines 332, 334. However, as opposed to providing direct input from the splitter to input 302 of controller 130, a first line 314a is provided to valve 370 through input 372 and a second line 314b is provided through output 374 of valve 370. Line 314b extends to input 302 of controller 130 to provide ABS braking to the rear wheels through lines 328, 330. Foot-controlled master cylinder 134 includes hydraulic line 376 which couples to valve 370 at input 380 which outputs at 314b to provide ABS braking through lines 328, 330 to rear wheels 324, 326.

Figure 12:
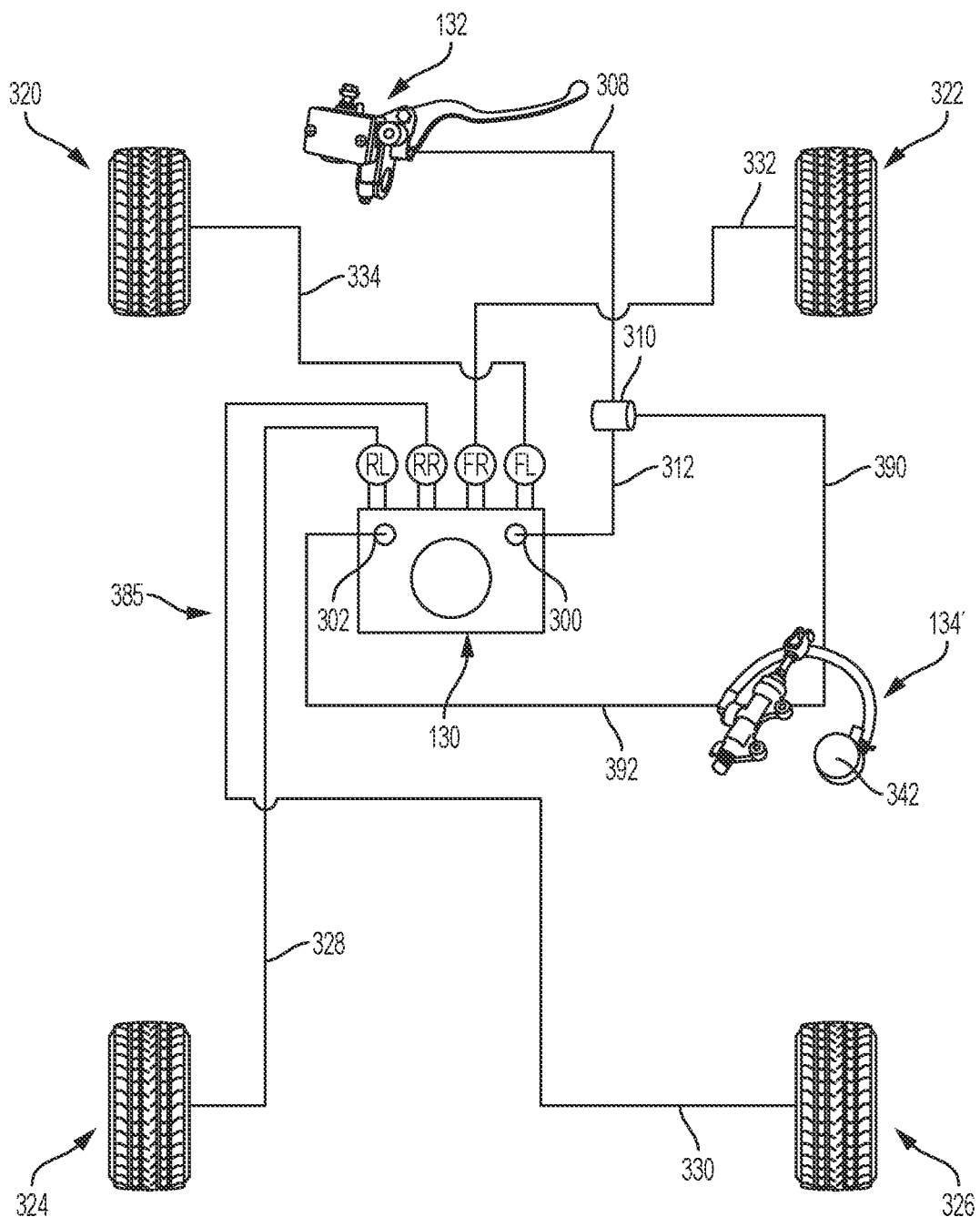
FIG. 12 shows an alternative hydraulic schematic view of a braking control system having a dual input foot controlled master cylinder to provide 4 wheel ABS control from the hand controlled master cylinder and rear wheel ABS from the foot controlled master cylinder.

With reference now to FIG. 12, another embodiment of a braking control system is disclosed at 385 having four wheeled ABS braking through the hand-controlled master cylinder 132 and two wheeled rear wheel ABS with an alternate foot-controlled master cylinder 134'. As shown, foot-controlled master cylinder 134' is a dual input master cylinder. In this embodiment, the front wheel ABS operates in a similar manner to that shown in FIGS. 10 and 11, where master cylinder 132 is coupled to line 308 which feeds splitter 310. Line 312 comes out of splitter 310 to feed input 300 of controller 130 whereby front ABS is provided through lines 332 and 334 to front wheels 320 and 322. However, a second line 390 splits through splitter 310 to feed a first input of dual input master cylinder 134' to feed line 392 provided to input 302 of controller 130. In this case, line 392 provides ABS through lines 328 and 330 to rear wheels 324 and 326. In the case of activation of actuator 342 of foot-controlled master cylinder 134°, again, hydraulic pressure is introduced through line 392 to input 302 of controller 130 to provide rear ABS through lines 328 and 330 to rear wheels 324 and 326.

Figure 13:
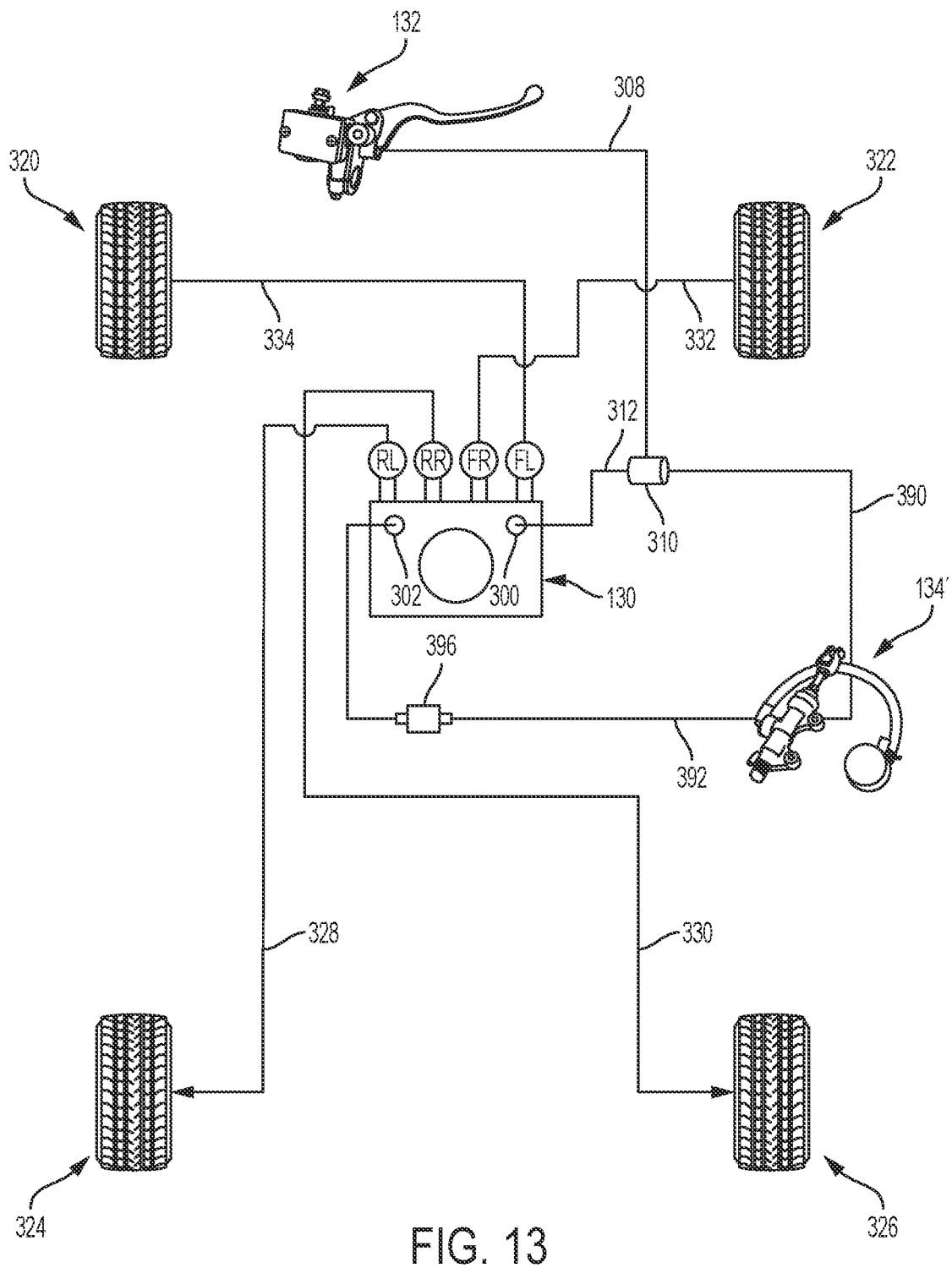
FIG. 13 shows an alternative hydraulic schematic view of a braking control system similar to that of FIG. 12.

FIG. 13 is an embodiment similar to that of FIG. 12, having external pressure transducer at 396.

Figure 14:
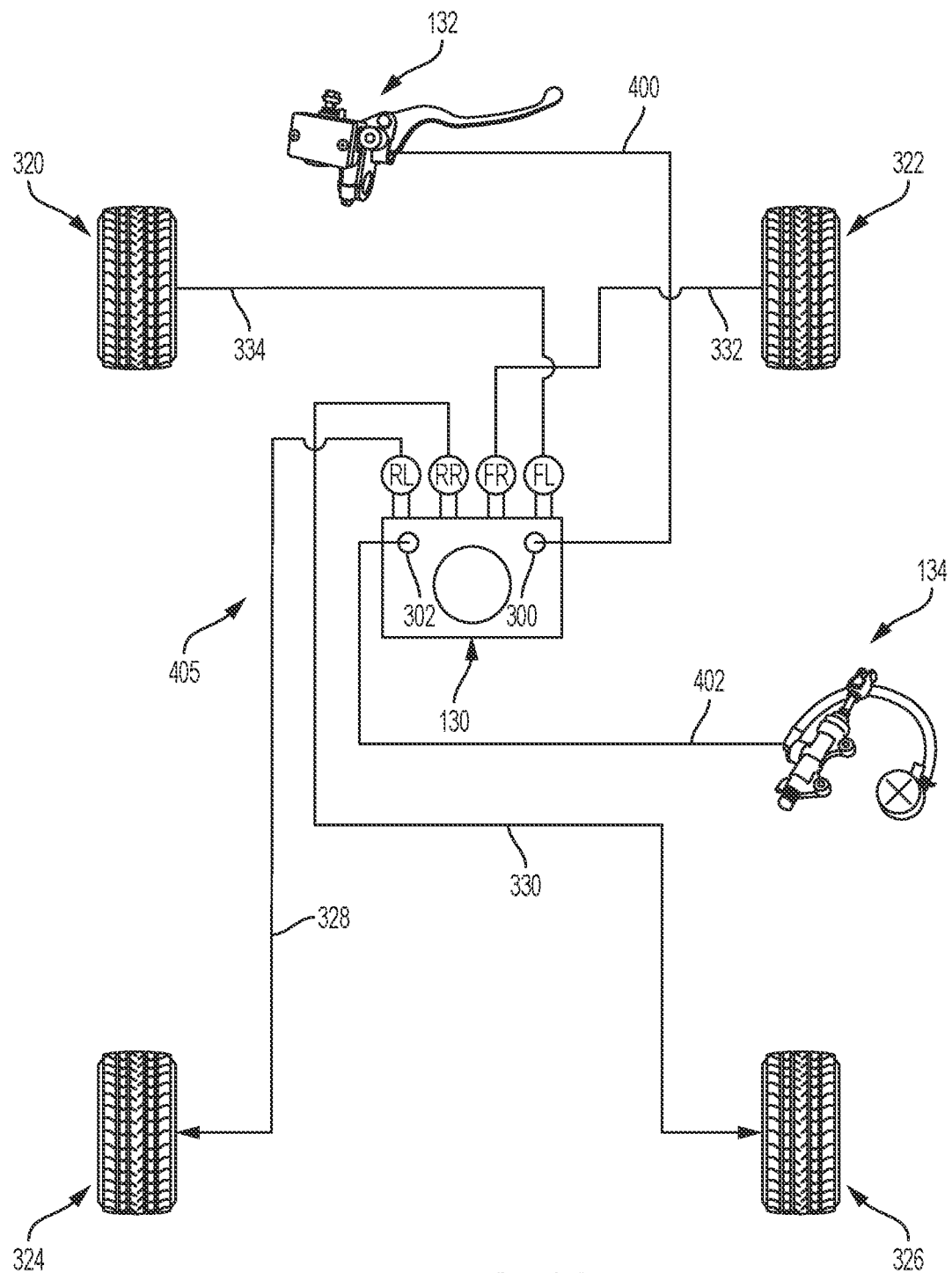
FIG. 14 shows an alternative hydraulic schematic view of a braking control system having front wheel ABS control from the hand controlled master cylinder and rear wheel ABS from the foot controlled master cylinder.
Figure 15:
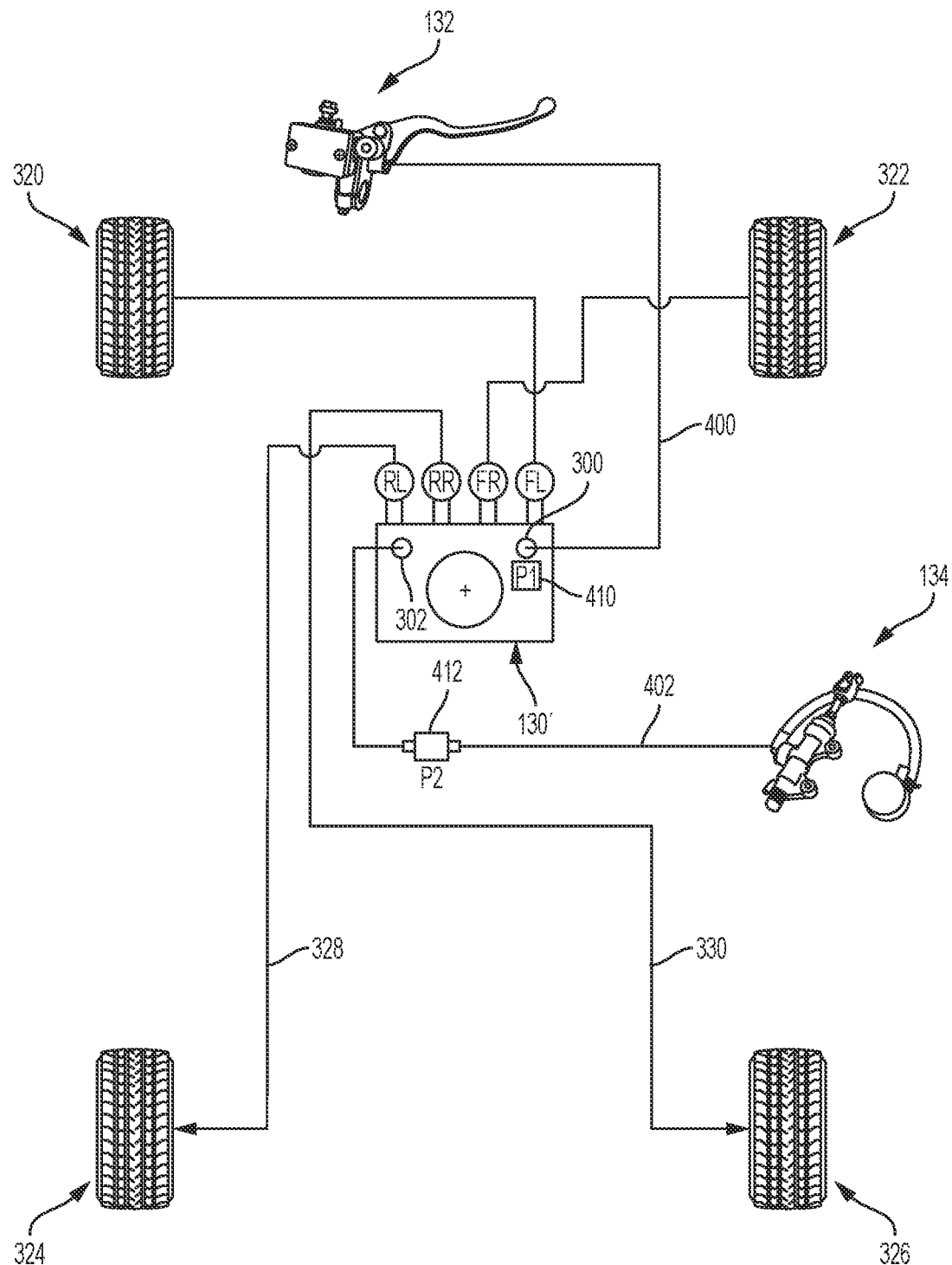
FIG. 15 shows an alternate hydraulic schematic view of a braking control system similar to that of FIG. 14.

With reference now to FIGS. 14 and 15, another embodiment of a braking control system is disclosed at 405 where the hand-controlled master cylinder 132 provides ABS braking to the front wheels 320, 322 and the foot-controlled master cylinder 134 provides ABS control to the rear wheels 324, 226. As shown, hand master cylinder 132 includes a hydraulic line 400 providing input directly to input 300 of controller 130 to control ABS braking through lines 332 and 334 for front wheels 320, 322. In a like manner, foot-controlled master cylinder 134 has a hydraulic line 402 directly input to line 302 of controller 130 to control ABS braking through lines 328 and 330 to rear wheels 324, 326.

As shown in FIG. 15, controller 130' includes an internal pressure transducer at 410 and an external pressure transducer is provided at 412.

Figure 16:
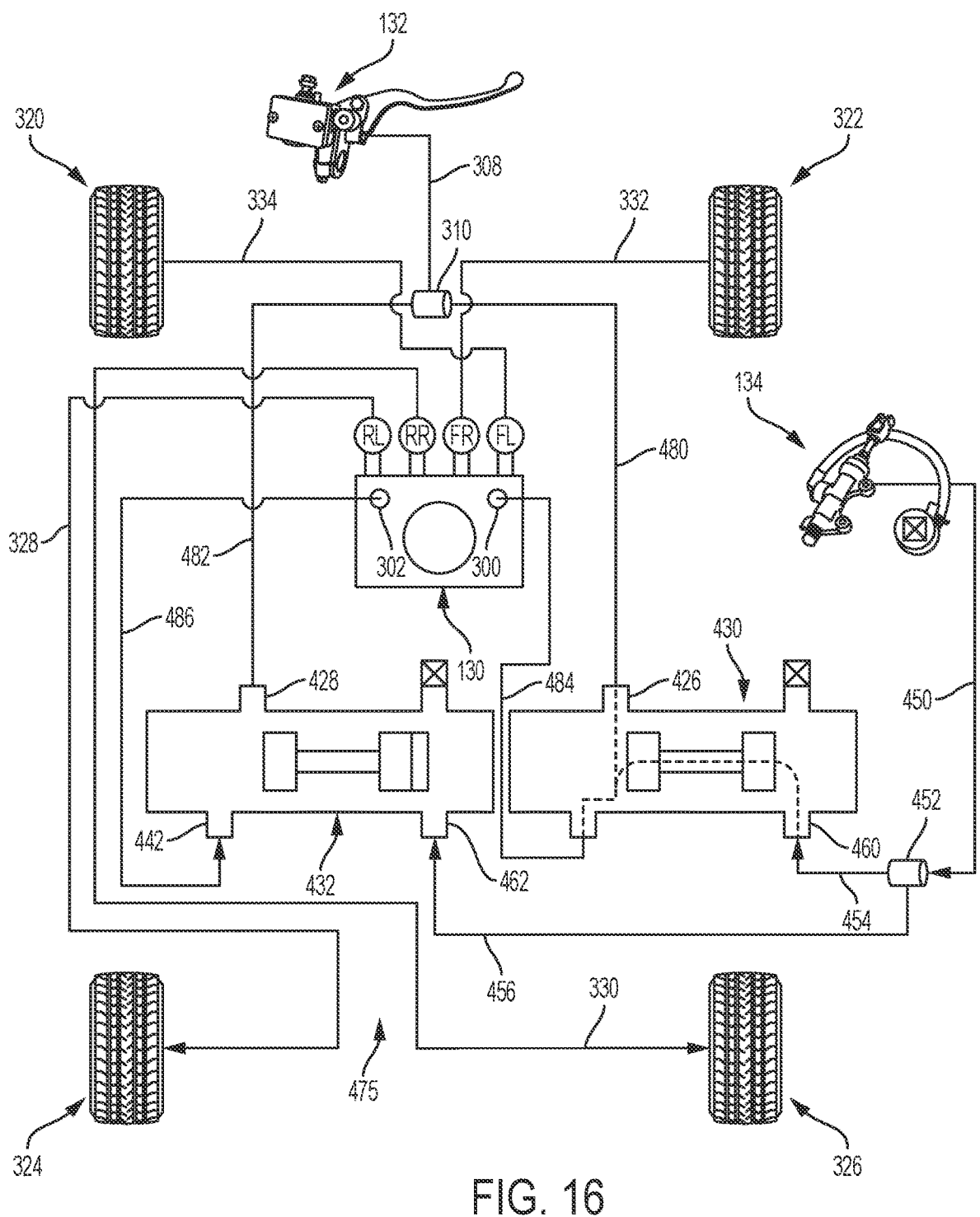
FIG. 16 shows an alternative hydraulic schematic view of a braking control system having 4 wheel ABS braking from the hand controlled master cylinder and 4 wheel ABS braking from the foot controlled master cylinder.

With reference now to FIG. 16, another embodiment of a braking control system is disclosed at 475 which provides four channel ABS braking from either the hand-controlled master cylinder 132 or the foot-controlled master cylinder 134. As shown in FIG. 16, line 308 from master cylinder 132 goes to splitter 310 where a first line 480 is input to the input 426 of diverter valve 430 and a second line 482 is input to the input 428 of diverter valve 432. The output of diverter valve 430 is at 484, which is input to the input 300 of controller 130 and the output 486 of diverter valve 432 is input to the input 302 of controller 130. From there, four channel ABS braking is provided, that is, from line 332 to right front wheel 322, from line 334 to front left wheel 320, through line 328 to left rear wheel 324 and through line 330 to right rear wheel 326.

Figure 17:
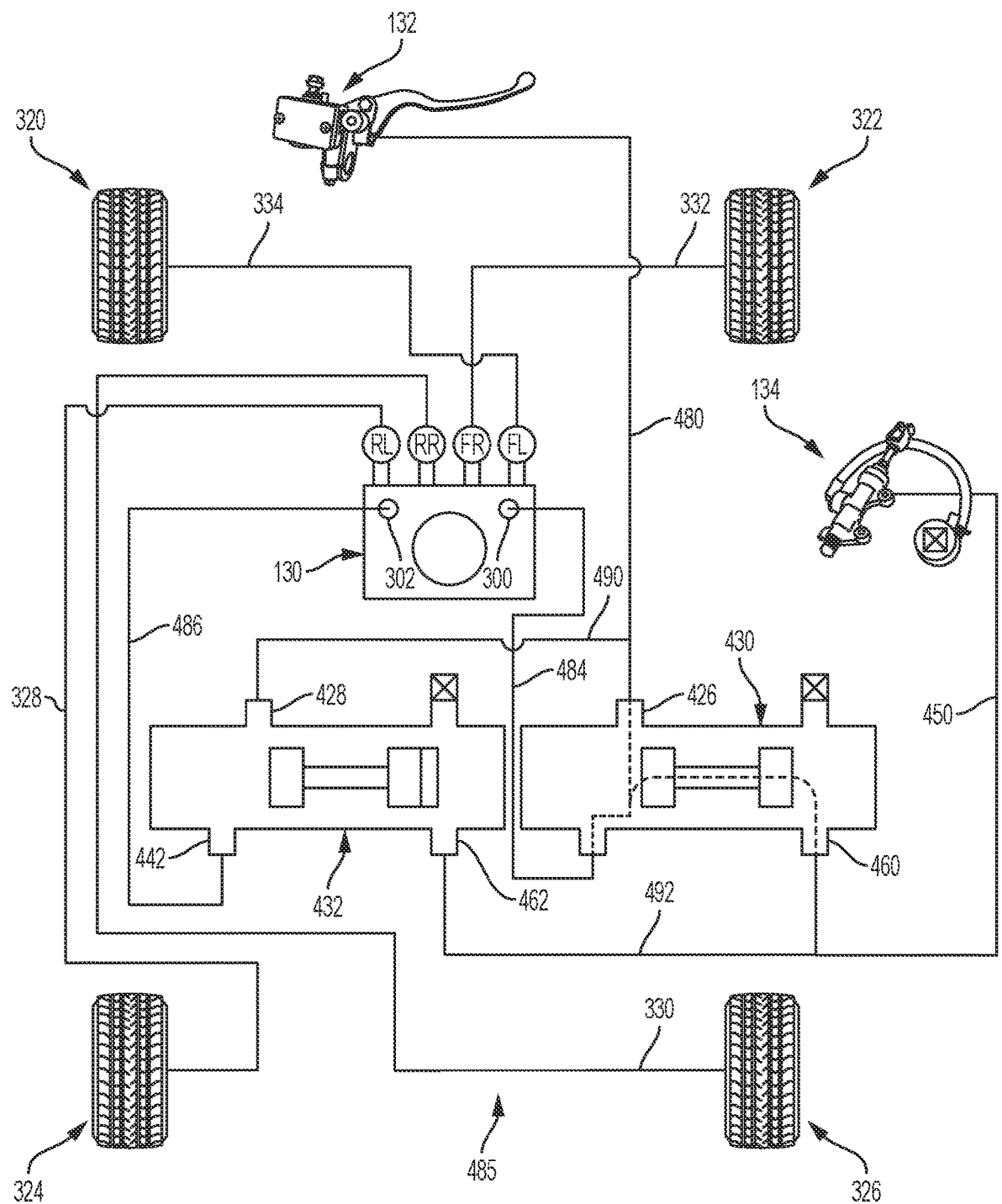
FIG. 17 shows an alternate hydraulic schematic view of a braking control system similar to that shown in FIG. 16.

With reference now to FIG. 17, another embodiment of a braking control system is disclosed at 485 which provides the ABS braking system in a manner similar to that shown in FIG. 16. Rather, the splitters 310 and 452 are eliminated, and line 480 extends directly from hand-controlled master cylinder 132 and input directly to input 426 of diverter valve 430. Line 490 is a jumper from line 480 to input 428 of diverter valve 432. In a like manner, line 450 of foot-controlled master cylinder 134 is input directly to input 460 of diverter valve 430 and a jumper 492 extends to input 462 of diverter valve 432. From there, the ABS braking system works identical to that described above with reference to FIG. 16.

Figure 18:
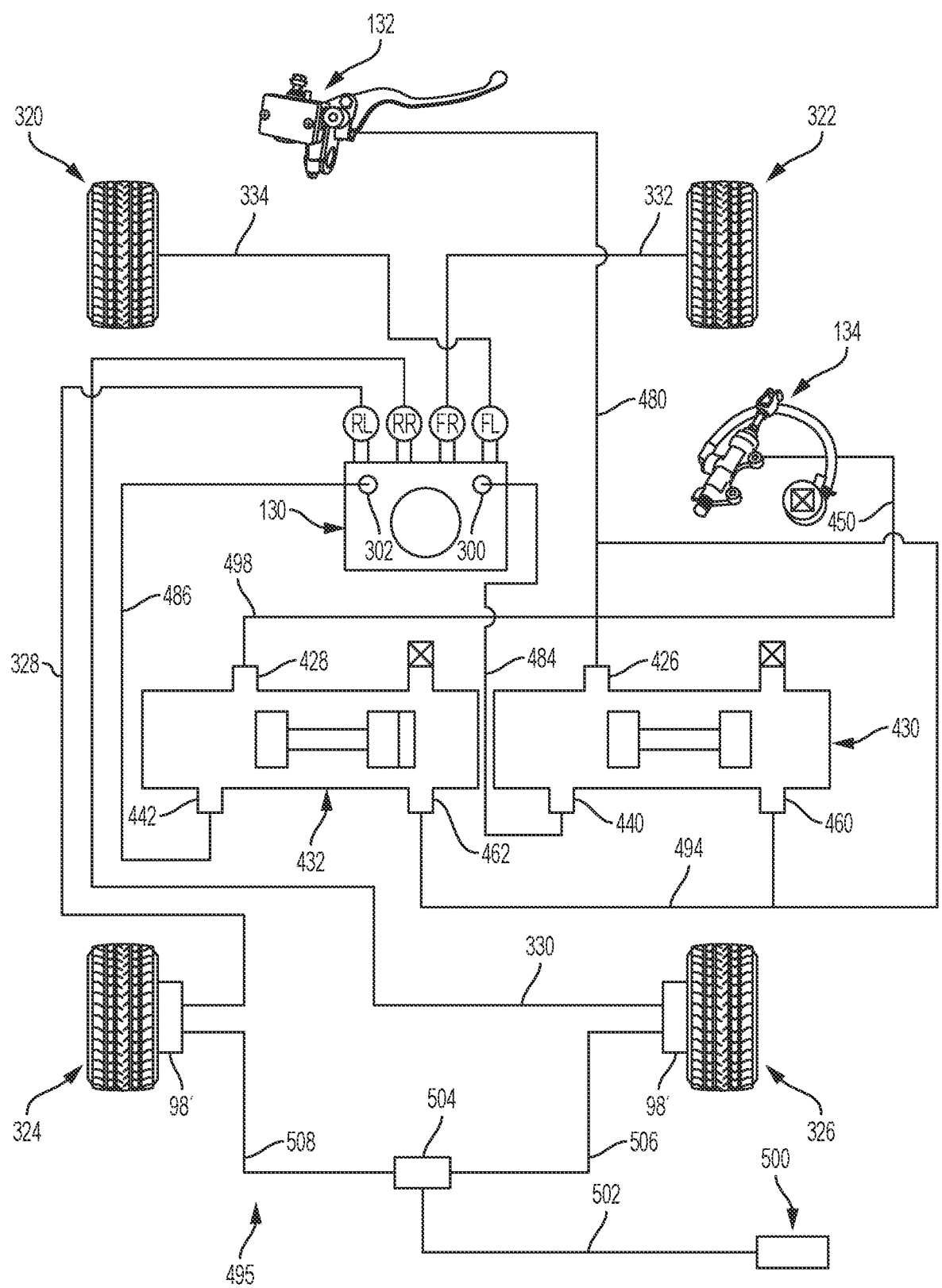
FIG. 18 shows an embodiment having an additional master cylinder for use as a parking brake.

With reference now to FIG. 18, another embodiment of a braking control system is disclosed at 495 which provides the ABS braking system in a manner similar to that shown in FIG. 17. In this embodiment, line 480 extends directly from hand-controlled master cylinder 132 and inputs directly to input 460 of diverter valve 430. Line 494 is a jumper from line 480 to input 462 of diverter valve 432. In a like manner, line 450 of foot-controlled master cylinder 134 is input directly to input 426 of diverter valve 430 and a jumper 498 extends to input 428 of diverter valve 432. In addition, a third master cylinder is provided at 500 having a line 502 which supplies a splitter 504 to provide pressure through lines 506 and 508 to calipers 98', which are dual input calipers. Master cylinder 500 is optional for such use as a parking brake, where master cylinder 500 is stored in a location such as in a glove box or other convenient position.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An all-terrain vehicle, comprising:
    a frame;
    at least four ground engaging members supporting the frame;
    a powertrain supported by the frame and including at least one final drive drivingly coupled to at least some of the ground engaging members; and
    a braking system comprising:
        an anti-lock braking control module;
        a first brake master cylinder hydraulically coupled to the anti-lock braking control module;
        a second brake master cylinder hydraulically coupled to the anti-lock braking control module;
        a first brake actuator coupled to the first brake master cylinder;
        a second brake actuator coupled to the second brake master cylinder; and
        a brake caliper coupled to each of the at least four ground engaging members,
    wherein the first brake master cylinder provides independent four-channel anti-lock braking to the at least four ground engaging members upon actuation by the first brake actuator, and
    wherein the second brake master cylinder provides independent four-channel anti-lock braking to the at least four ground engaging members upon actuation by the second brake actuator.

2. The all-terrain vehicle of claim 1, wherein the ground engaging members comprise at least a front pair of ground engaging members and a rear pair of ground engaging members,
    wherein the first brake master cylinder provides anti-lock braking to both the front and rear pairs of ground engaging members upon actuation by the first brake actuator, and
    wherein the second brake master cylinder provides anti-lock braking to both the front and rear pairs of ground engaging members upon actuation by the second brake actuator.

3. The all-terrain vehicle of claim 2, wherein the first brake actuator for the first brake master cylinder is a hand controlled actuator.

4. The all-terrain vehicle of claim 3, wherein the second brake actuator for the second brake master cylinder is a foot controlled actuator.

5. The all-terrain vehicle of claim 1, wherein the braking system further comprises:
    a first diverter valve hydraulically coupled to the anti-lock braking control module,
    a second diverter valve hydraulically coupled to the anti-lock braking control module,
    a first splitter hydraulically coupled intermediate the first brake master cylinder and the first and second diverter valves; and
    a second splitter hydraulically coupled intermediate the second brake master cylinder and the first and second diverter valves.

6. The all-terrain vehicle of claim 1, wherein the braking system further comprises:
    a first diverter valve hydraulically coupled intermediate the anti-lock braking control module and the first and second brake master cylinders; and
    a second diverter valve hydraulically coupled intermediate the anti-lock braking control module and the first and second brake master cylinders.

7. The all-terrain vehicle of claim 1, wherein the at least one final drive includes a first final drive drivingly coupled to at least one front ground engaging member, and a second final drive drivingly coupled to at least one rear ground engaging member.

8. The all-terrain vehicle of claim 1, wherein the braking system further comprises an external pressure transducer hydraulically coupled to at least one of the first and second brake master cylinders and to the anti-lock braking control module, the external pressure and transducer external to the anti-lock braking control module.

9. The all-terrain vehicle of claim 8, wherein the braking system further comprises an internal pressure transducer hydraulically coupled to the other of the first and second brake master cylinders and integrated into the anti-lock braking control module.

10. The all-terrain vehicle of claim 1, further comprising a speed monitor for at least some of the ground engaging members.

11. The all-terrain vehicle of claim 10, further comprising stub shafts extending from the at least one final drive to the ground engaging members.

12. The all-terrain vehicle of claim 11, wherein the speed monitor comprises a gear ring positioned on an exterior surface of each of the stub shafts and a speed pickup positioned adjacent to the gear ring.

13. An all-terrain vehicle, comprising:
    a frame;
    ground engaging members supporting the frame;
    a powertrain supported by the frame and including at least one final drive drivingly coupled to at least some of the ground engaging members; and
    a braking system comprising:

an anti-lock braking control module including an internal pressure transducer;

a rear brake master cylinder hydraulically coupled to the anti-lock braking control module;

a front brake actuator coupled to the front brake master cylinder;

a rear brake actuator coupled to the rear brake master cylinder;

a brake caliper coupled to the ground engaging members; and an external pressure transducer positioned along a hydraulic line extending from the rear brake master cylinder to the anti-lock braking control module, wherein the internal pressure transducer is hydraulically couple to both the front and rear brake master cylinders and to the anti-lock braking control module, and the external pressure transducer is hydraulically coupled to only the rear brake master cylinder and to the anti-lock braking control module.

14. The all-terrain vehicle of claim 13, wherein the external pressure transducer hydraulically coupled to the rear brake master cylinder.

15. The all-terrain vehicle of claim 14, wherein the rear brake actuator is a foot controlled actuator.

16. The all-terrain vehicle of claim 15, wherein the front brake actuator is a hand controlled actuator.

17. The all-terrain vehicle of claim 13, wherein the external pressure transducer is hydraulically coupled to the front brake master cylinder.

18. The all-terrain vehicle of claim 13, wherein the front brake master cylinder provides anti-lock braking to the ground engaging members upon actuation by the front brake actuator, and the rear brake master cylinder provides anti-lock braking to the ground engaging members upon actuation by the rear brake actuator.

19. The all-terrain vehicle of claim 18, wherein the ground engaging members comprise at least a front pair of ground engaging members and a rear pair of ground engaging members.

* * * * *